United States Patent
Takenouchi et al.

(10) Patent No.: US 8,391,181 B2
(45) Date of Patent: Mar. 5, 2013

(54) COMMUNICATION DEVICE, DEVICE FOR DETERMINING POSSIBILITY OF DISCRIMINATING RELATION OF PSEUDONYMOUS-NAME COMMUNICATION IDENTIFIER, COMMUNICATION SYSTEM, COMMUNICATION METHOD AND STORAGE MEDIUM

(75) Inventors: Takao Takenouchi, Tokyo (JP); Naoko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 303 days.

(21) Appl. No.: 12/866,213

(22) PCT Filed: Jan. 28, 2009

(86) PCT No.: PCT/JP2009/051376
§ 371 (c)(1),
(2), (4) Date: Aug. 4, 2010

(87) PCT Pub. No.: WO2009/110265
PCT Pub. Date: Sep. 11, 2009

(65) Prior Publication Data
US 2010/0316047 A1 Dec. 16, 2010

(30) Foreign Application Priority Data
Mar. 3, 2008 (JP) ................................ 2008-052601

(51) Int. Cl.
*H04L 12/28* (2006.01)
*H04L 12/66* (2006.01)
*H04J 3/16* (2006.01)

(52) U.S. Cl. ........ 370/254; 370/356; 370/392; 370/469; 709/245

(58) Field of Classification Search ........................ None
See application file for complete search history.

(56) References Cited

U.S. PATENT DOCUMENTS

| | | | |
|---|---|---|---|
| 7,047,561 B1 * | 5/2006 | Lee | 726/12 |
| 7,302,496 B1 * | 11/2007 | Metzger | 709/245 |
| 7,590,073 B2 * | 9/2009 | Beckmann et al. | 370/254 |
| 2002/0133598 A1 * | 9/2002 | Strahm et al. | 709/228 |

FOREIGN PATENT DOCUMENTS

| | | |
|---|---|---|
| JP | 2006081202 A | 3/2006 |
| JP | 2007006154 A | 1/2007 |

OTHER PUBLICATIONS

International Search Report for PCT/JP2009/051376 mailed May 12, 2009.
J. Rosenberg. "Obtaining and Using Globally Routable User Agent (UA) URIs (GRUU) in the Session Initiation Protocol (SIP)", Internet Engineering Task Force Internet-Draft, draft-ietf-sip-gruu-15, Oct. 11, 2007.

* cited by examiner

*Primary Examiner* — Melanie Jagannathan

(57) ABSTRACT

To determine a relation discrimination possibility of a pseudonymous-name communication identifier so that, in each communication layer, no mismatch occurs between a pseudonymous-name communication identifier whose relation can be discriminated and a pseudonymous-name communication identifier whose relation cannot be discriminated. The Relation discrimination possibility determination means 2 determines a relation discrimination possibility of a pseudonymous-name communication identifier of a specific communication layer among a plurality of communication layers to a designated one of relation discrimination possible and relation discrimination impossible. It determines a relation discrimination possibility of a pseudonymous-name communication identifier of other communication layers to relation discrimination possible or relation discrimination impossible according to which one of relation discrimination possible and relation discrimination impossible the pseudonymous-name communication identifier of the specific communication layer is.

26 Claims, 22 Drawing Sheets

| | DETAILS OF RULE |
|---|---|
| FIRST RULE | IF PSEUDONYMOUS-NAME COMMUNICATION IDENTIFIER OF UPPER LAYER IS PSEUDONYMOUS-NAME COMMUNICATION IDENTIFIER WHOSE RELATION CANNOT BE DISCRIMINATED, PSEUDONYMOUS-NAME COMMUNICATION IDENTIFIER OF LOWER LAYER SHOULD BE MADE RELATION DISCRIMINATION IMPOSSIBLE |
| SECOND RULE | IF PSEUDONYMOUS-NAME COMMUNICATION IDENTIFIER OF UPPER LAYER IS PSEUDONYMOUS-NAME COMMUNICATION IDENTIFIER WHOSE RELATION CAN BE DISCRIMINATED, PSEUDONYMOUS-NAME COMMUNICATION IDENTIFIER OF LOWER LAYER SHOULD BE MADE RELATION DISCRIMINATION POSSIBLE |

Fig. 4

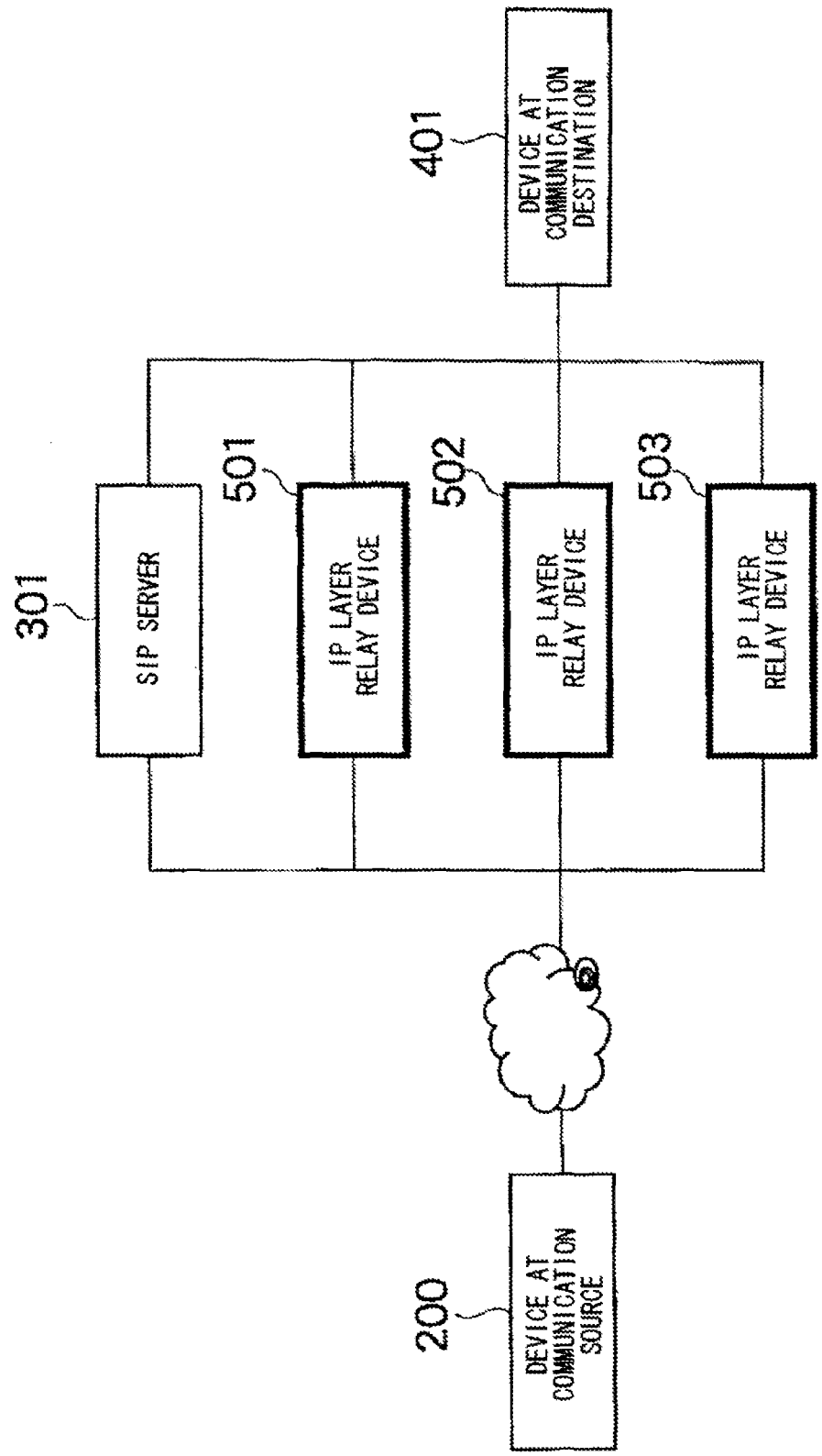

| COMMUNICATION TYPE | COMMUNICATION LAYER |
|---|---|
| SIP PHONE | SIP LAYER |
| | IP LAYER |
| MAIL | SMTP LAYER |

Fig. 10

| COMMUNICATION DESTINATION IDENTIFIER | COMMUNICATION LAYER |
|---|---|
| 10.10.10.10 | SIP LAYER |
| | IP LAYER |
| 192.168.1.1~192.168.1.255 | SIP LAYER |
| | IP LAYER |
| | ETHERNET MAC LAYER |

Fig. 13

| | DETAILS OF RULE |
|---|---|
| FIRST RULE | IF PSEUDONYMOUS-NAME COMMUNICATION IDENTIFIER OF UPPER LAYER IS PSEUDONYMOUS-NAME COMMUNICATION IDENTIFIER WHOSE RELATION CANNOT BE DISCRIMINATED, PSEUDONYMOUS-NAME COMMUNICATION IDENTIFIER OF LOWER LAYER SHOULD BE MADE RELATION DISCRIMINATION IMPOSSIBLE |
| THIRD RULE | IF THERE IS POSSIBILITY OF TRANSFER AND PSEUDONYMOUS-NAME COMMUNICATION IDENTIFIER OF UPPER LAYER IS PSEUDONYMOUS-NAME COMMUNICATION IDENTIFIER WHOSE RELATION CAN BE DISCRIMINATED, PSEUDONYMOUS-NAME COMMUNICATION IDENTIFIER OF LOWER LAYER SHOULD BE MADE RELATION DISCRIMINATION POSSIBLE |

Fig. 16

COMMUNICATION DEVICE, DEVICE FOR DETERMINING POSSIBILITY OF DISCRIMINATING RELATION OF PSEUDONYMOUS-NAME COMMUNICATION IDENTIFIER, COMMUNICATION SYSTEM, COMMUNICATION METHOD AND STORAGE MEDIUM

This application is the National Phase of PCT/JP2009/051376, filed Jan. 28, 2009, which is based upon and claims the benefit of priority from Japanese patent application No. 2008-052601, filed on Mar. 3, 2008, the disclosure of which is incorporated herein in its entirety by reference.

TECHNICAL FIELD

The present invention relates to a communication device, a device for determining a possibility of discriminating a relation of a pseudonymous-name communication identifier, communication system, a communication method and a storage medium.

BACKGROUND ART

When communication is performed between one device and another, a communication identifier is used to identify the device at the communication destination and/or the device at the communication source.

In recent years, a technique in which when a device at the communication source communicates with a device at the communication destination, a temporarily used communication identifier, rather than a permanently used communication identifier, is used as the communication identifier of the device at the communication source in order to prevent the communication identifier of the device at the communication source from being identified by the device at the communication destination has been used.

This temporarily used communication identifier is called "pseudonymous-name communication identifier" while the permanently used communication identifier is called "real-name communication identifier".

Examples of prior-art technique documents disclosing a communication method using a pseudonymous-name communication identifier like this include Non-patent document 1.

Non-patent document 1 discloses a technique to perform communication using an SIP (Session Initiation Protocol) by using GRUUs (Globally Routable User Agent URIs).

In the SIP, a real-name communication identifier called "SIP-URI" is used as a communication identifier. However, in the GRUU, there is a temporarily used communication identifier called "Temporary GRUU".

This Temporary GRUU can be used as a pseudonymous-name communication identifier.

By using a Temporary GRUU, a device at the communication source, for example, can communicate with a device at the communication destination by using a Temporary GRUU indicating the device at the communication destination.

That is, even if the device at the communication source does not know the real-name communication identifier, which is SIP-URI, the device at the communication source can communicate with the device at the communication destination by using the pseudonymous-name communication identifier called "Temporary GRUU".

Further, there are two types of pseudonymous-name identifiers, i.e., a pseudonymous-name communication identifier whose relation cannot be discriminated and a pseudonymous-name communication identifier whose relation can be discriminated.

The pseudonymous-name communication identifier whose relation cannot be discriminated means a communication identifier for which, when observed from the device at the communication destination, it cannot be determined that a plurality of pseudonymous-name communication identifiers indicate the same communication source device. For example, a pseudonymous-name communication identifier whose relation cannot be discriminated can be implemented by using a different pseudonymous-name communication identifier for each access to the same communication destination device.

Examples of its application include a case in which when a certain device at the communication source purchases a commodity in a certain Web site, a different pseudonymous-name communication identifier whose relation cannot be discriminated is used for each purchase of a commodity so that it is possible to prevent a commodity purchase history indicating what kinds of commodities the device at the communication source has purchased until now from being recorded.

That is, when the device at the communication source does not want its own commodity purchase history to be recorded, it may use a pseudonymous-name communication identifier whose relation cannot be discriminated.

In contrast to this, the pseudonymous-name communication identifier whose relation can be discriminated means a communication identifier for which, when observed from the device at the communication destination, it can be determined that a plurality of pseudonymous-name communication identifiers indicate the same communication source device.

For example, when a certain device at the communication source purchases a commodity in a certain Web site by using a pseudonymous-name communication identifier whose relation can be discriminated, it is possible to specify the device at the communication source that uses that pseudonymous-name communication identifier even if the same pseudonymous-name communication identifier is used for each purchase of a commodity.

Therefore, in the Web site, the preference of the device at the communication source can be analyzed by using the commodity purchase history from the device at the communication source, and recommendation of commodities that suit the preference of the device at the communication source can be made. Accordingly, the convenience of the Web site can be also improved for the device at the communication source.

That is, when the device at the communication source does not mind that its commodity purchase history is recorded and does want commodities that suit its preference to be recommended based on the commodity purchase history, it may use a pseudonymous-name communication identifier whose relation can be discriminated.

From these facts, whether the relation of a pseudonymous-name communication identifier should be able to be discriminated or not is preferably selected as appropriate for each communication.

[Non-patent Document 1]

J. Rosenberg "Obtaining and Using Globally Routable User Agent (UA) URIs (GRUU) in the Session Initiation Protocol (SIP)", Internet Engineering Task Force Internet-Draft, draft-ietf-sip-gruu-15, Oct. 11, 2007, http://www.ietforg/internet-drafts/draft-ietf-sip-gruu-15.txt

DISCLOSURE OF INVENTION

Technical Problem

However, there are following problems in communications using a pseudonymous-name communication identifier.

A first problem is that, in each communication layer, a device at the communication source can be uniquely identified due to mismatch between a pseudonymous-name communication identifier whose relation can be discriminated and a pseudonymous-name communication identifier whose relation cannot be discriminated and the behavior of the device at the communication source thereby can be traced. For example, in a case where a device at the communication source is performing communication with a device at the communication destination by using a pseudonymous-name communication identifier, if the relation of the pseudonymous-name communication identifier of the device at the communication source can be discriminated in a lower layer even though the pseudonymous-name communication identifier of the device at the communication source cannot be discriminated in an upper layer, the device at the communication destination can uniquely identify the device at the communication source based on the pseudonymous-name communication identifier whose relation can be discriminated in the lower layer. Therefore, the behavior of the device at the communication source can be traced, thus making the use of the pseudonymous-name communication identifier whose relation cannot be discriminated meaningless. In order to prevent this problem, it is necessary to select, in each communication layer, a relation discrimination possibility of a pseudonymous-name communication identifier without contradiction.

A second problem is that information of the device at the communication source can be surmised due to the change of a pseudonymous-name communication identifier in a lower communication layer. For example, assume a case where the device at the communication source is a mobile terminal, and where a user possessing the mobile terminal travels and the mobile terminal thereby performs roaming. In such a case, the communication identifier such as an IP address of the mobile terminal changes. Therefore, the device at the communication destination can surmise that the device at the communication source has probably moved based on the fact that the communication identifier of the device at the communication source has changed. As described above, since there is a possibility that information of the device at the communication source can be surmised based on the change of the pseudonymous-name communication identifier in a lower communication layer, it is desirable to make the change of a pseudonymous-name communication identifier in a lower communication layer invisible from the device at the communication destination.

In view of the above-described problems, a first object of the present invention is to provide a communication device capable of determining a relation discrimination possibility of a pseudonymous-name communication identifier so that, in each communication layer, no mismatch occurs between a pseudonymous-name communication identifier whose relation can be discriminated and a pseudonymous-name communication identifier whose relation cannot be discriminated, a communication system, a communication method, and a storage medium.

Further, a second object of the present invention is to provide a communication device capable of preventing information of a device at the communication source from being surmised due to a change of a pseudonymous-name communication identifier in a lower communication layer, a communication system, a communication method, and a storage medium.

To solve the above-described problem, a communication device in accordance with the present invention includes: communication means capable of performing communication configured from a plurality of communication layers by using a pseudonymous-name communication identifier in a communication layer where a communication identifier needs to be converted into a pseudonymous name, and relation discrimination possibility determination means to determine a relation discrimination possibility of a pseudonymous-name communication identifier of a communication layer where a communication identifier needs to be converted into a pseudonymous name when the communication is performed by the communication means, wherein the relation discrimination possibility determination means determines a relation discrimination possibility of a pseudonymous-name communication identifier of a specific communication layer among the plurality of communication layers to a designated one of relation discrimination possible and relation discrimination impossible, and determines whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

A device to determine a relation discrimination possibility of a pseudonymous-name communication identifier in accordance with the present invention includes: relation discrimination possibility determination means to determine a relation discrimination possibility of a pseudonymous-name communication identifier of a communication layer where a communication identifier needs to be converted into a pseudonymous name when a communication device capable of performing communication by using a pseudonymous-name communication identifier in a communication layer where a communication identifier needs to be converted into a pseudonymous name performs communication configured from a plurality of communication layers, and notification means to notify a determined relation discrimination possibility to the communication device, wherein the relation discrimination possibility determination means determines a relation discrimination possibility of a pseudonymous-name communication identifier of a specific communication layer among the plurality of communication layers to a designated one of relation discrimination possible and relation discrimination impossible, and determines whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name identifier of the specific communication layer is.

A communication system in accordance with the present invention includes a communication device, and a communication destination device with which the communication device communicates, the communication device including: communication means capable of performing communication configured from a plurality of communication layers by using a pseudonymous-name communication identifier in a communication layer where a communication identifier needs to be converted into a pseudonymous name, and relation discrimination possibility determination means to determine a relation discrimination possibility of a pseudonymous-name communication identifier of a communication layer where a communication identifier needs to be converted into a pseudonymous name when the communication is performed by the communication means, wherein the relation discrimination possibility determination means determines a relation discrimination possibility of a pseudonymous-name communication identifier of a specific communication layer among the plurality of communication layers to a designated one of relation discrimination possible and relation discrimination impossible, and determines whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

A communication method in accordance with the present invention includes: a first step of determining a relation discrimination possibility of a pseudonymous-name communication identifier of a communication layer where a communication identifier needs to be converted into a pseudonymous name when communication configured from a plurality of communication layers is performed by communication means capable of performing communication by using a pseudonymous-name communication identifier in a communication layer where a communication identifier needs to be converted into a pseudonymous name, wherein the first step including: a second step of determining a relation discrimination possibility of a pseudonymous-name communication identifier of a specific communication layer among the plurality of communication layers to a designated one of relation discrimination possible and relation discrimination impossible, and a third step of determining whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

A storage medium in accordance with the present invention stores a program that causes a computer to execute a first process of determining a relation discrimination possibility of a pseudonymous-name communication identifier of a communication layer where a communication identifier needs to be converted into a pseudonymous name when communication configured from a plurality of communication layers is performed by communication means capable of performing communication by using a pseudonymous-name communication identifier in a communication layer where a communication identifier needs to be converted into a pseudonymous name, wherein the first process including: a process of determining a relation discrimination possibility of a pseudonymous-name communication identifier of a specific communication layer among the plurality of communication layers to a designated one of relation discrimination possible and relation discrimination impossible, and a process of determining whether or not a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

Advantageous Effects

In accordance with the present invention, the problem that a communication source device can be uniquely identified due to mismatch of the pseudonymous-name communication identifier of each communication layer can be solved.

BRIEF DESCRIPTION OF DRAWINGS

FIG. 4 shows an example of a relation discrimination-property determination rule;

FIG. 6 is a block diagram showing a configuration of a communication system in accordance with a second exemplary embodiment;

FIG. 10 shows an example of communication type layer information;

FIG. 13 shows an example of communication destination layer information;

FIG. 16 shows an example of a relation discrimination-property determination rule;

Figure 1:
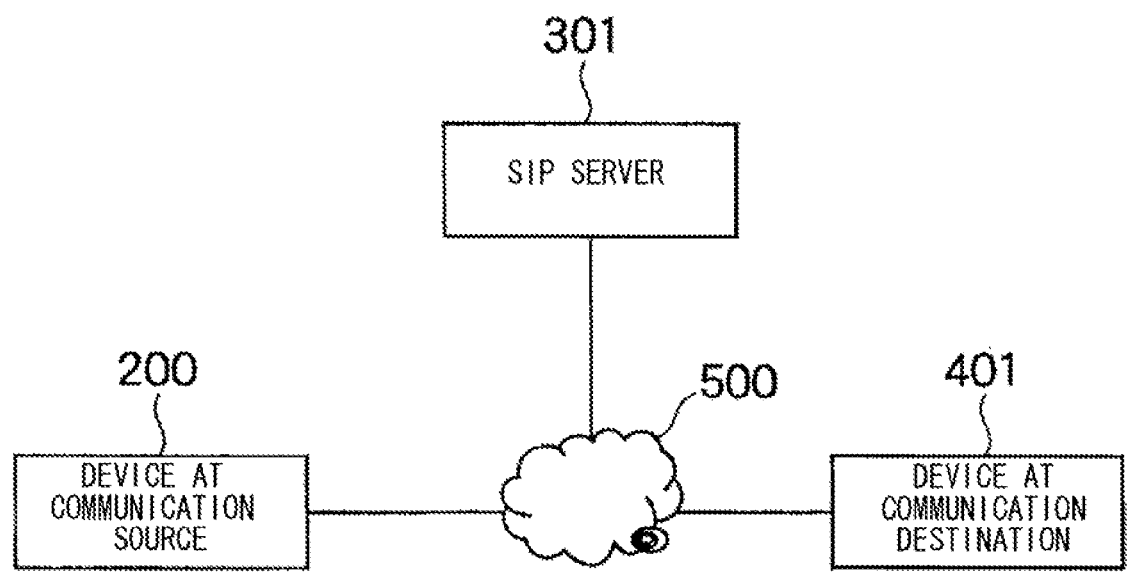
FIG. 1 is a block diagram showing a configuration of a communication system in accordance with a first exemplary embodiment.

2 CONTROL UNIT (RELATION DISCRIMINATION POSSIBILITY DETERMINATION MEANS, PSEUDONYMOUS-NAME CONVERSION REQUIRING COMMUNICATION LAYER RECOGNITION MEANS, TRANSFER PLAN RECOGNITION MEANS, PSEUDONYMOUS-NAME COMMUNICATION IDENTIFIER GENERATION MEANS, RELATION DISCRIMINATION POSSIBILITY INQUIRY MEANS)

4 COMMUNICATION UNIT (COMMUNICATION MEANS)

5 STORAGE UNIT

9 COMMUNICATION LAYER INFORMATION STORAGE AREA (COMMUNICATION LAYER INFORMATION STORAGE MEANS)

10 RELATION DISCRIMINATION POSSIBILITY DETERMINATION RULE STORAGE AREA (RELATION DISCRIMINATION-PROPERTY DETERMINATION RULE STORAGE MEANS)

11 IP ADDRESS SETTING STORAGE AREA

12 SIP-URI SETTING STORAGE AREA

13 IP LAYER RELAY DEVICE SETTING STORAGE AREA

14 COMMUNICATION TYPE LAYER INFORMATION STORAGE AREA (COMMUNICATION TYPE LAYER INFORMATION STORAGE MEANS)

15 COMMUNICATION DESTINATION LAYER INFORMATION STORAGE AREA (COMMUNICATION DESTINATION LAYER INFORMATION STORAGE MEANS)

16 TRANSFER POSSIBILITY INFORMATION STORAGE AREA (TRANSFER PLAN INFORMATION STORAGE MEANS)

200 COMMUNICATION SOURCE DEVICE (COMMUNICATION TERMINAL DEVICE)

401 COMMUNICATION DESTINATION DEVICE

501 IP LAYER RELAY DEVICE (RELAY DEVICE)

502 IP LAYER RELAY DEVICE (RELAY DEVICE)

503 IP LAYER RELAY DEVICE (RELAY DEVICE)

BEST MODE FOR CARRYING OUT THE INVENTION

Exemplary embodiments in accordance with the present invention are explained hereinafter with reference to the drawings.

First Exemplary Embodiment

In a first exemplary embodiment, an example in which a device at the communication source performs telephone communication with a device at the communication destination by using an SIP with a pseudonymous name is explained.

In telephone communication using an SIP, there are communication in an SIP layer and communication in an IP (Internet Protocol) layer.

In telephone communication using an SIP, communication is first performed in an SIP layer, which is an upper communication layer, to exchange information necessary for IP layer communication such as an IP address, which is a communication identifier of the device at the communication source and the device at the communication destination in the IP layer. After that, communication is performed between the device at the communication source and the device at the communication destination in the IP layer, which is a lower communication layer, to mutually exchange voice data of the telephone.

In the SIP layer, an SIP-URI (URI: Uniform Resource Identifier) is used as a communication identifier.

Meanwhile, an IP address is used as a communication identifier in the IP layer.

In the first exemplary embodiment, telephone communication using a pseudonymous-name SIP-URI, which is a pseudonymous-name communication identifier of the SIP-URI, is performed between a device at the communication source and a device at the communication destination. Therefore, assume that the device at the communication source knows only a pseudonymous-name SIP-URI of the device at the communication destination without knowing the real-name SIP-URI and the real IP address. Then, a pseudonymous-name IP address is exchanged between the device at the communication source and the device at the communication destination by using the pseudonymous-name SIP-URI, and the telephone voice data is exchanged by using the pseudonymous-name IP address.

Further, assume also that the terminal device at the communication source is configured to be able to freely set an IP address in the first exemplary embodiment. In Linux, for example, there is a command to set an IP address. Therefore, by using the command, an IP address can be freely set.

Next, a specific configuration is explained.

FIG. 1 is a block diagram showing a configuration of a communication system 100 in accordance with the first exemplary embodiment.

As shown in FIG. 1, the communication system 100 in accordance with the first exemplary embodiment includes a communication source device (communication device) 200, an SIP server 301, and a communication destination device 401. Further, these components are configured to be able to communicate with each other through a network 500.

Figure 2:
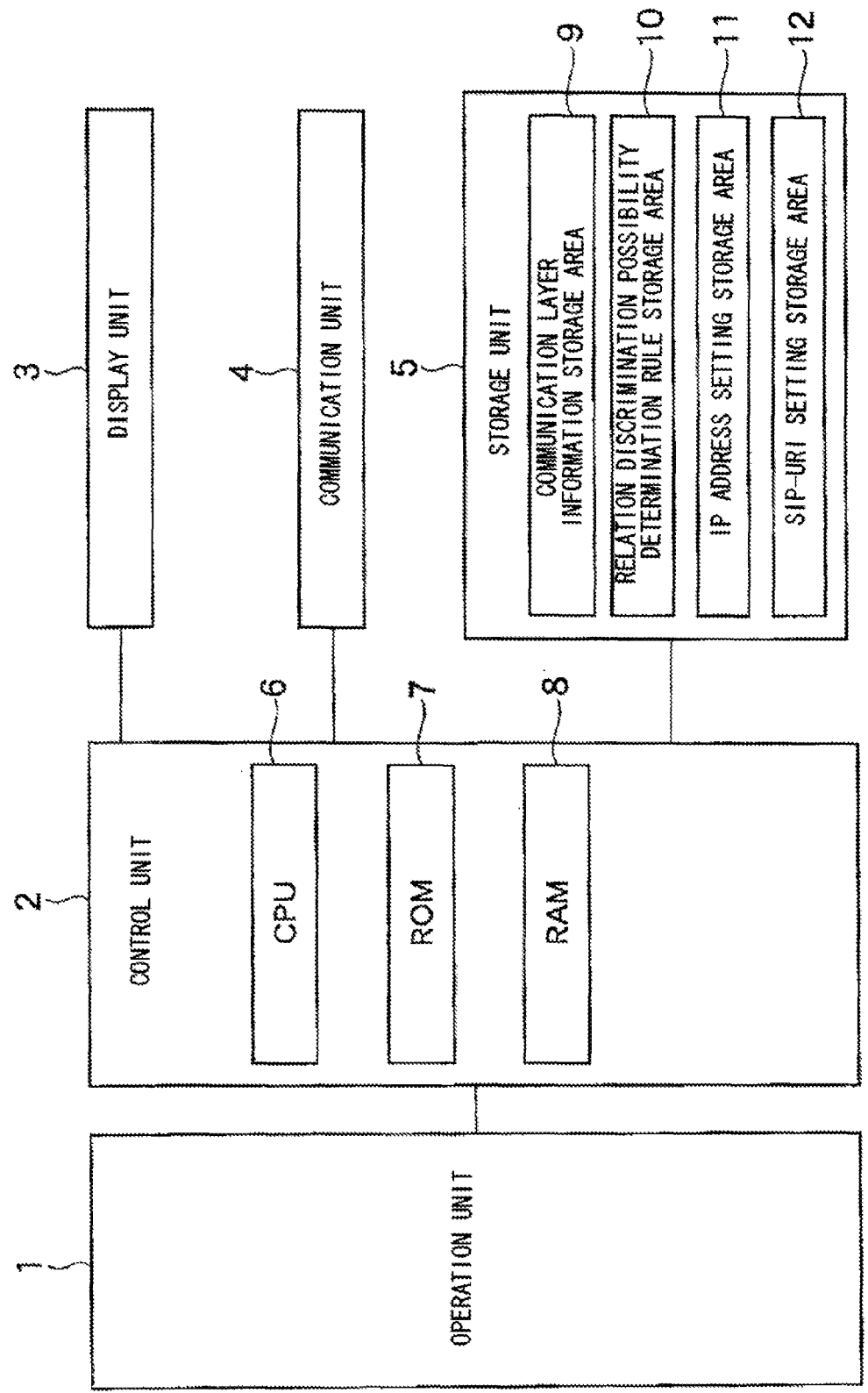
FIG. 2 is a block diagram showing a configuration of a communication source device (communication device) in accordance with a first exemplary embodiment.

FIG. 2 is a block diagram showing a configuration of the communication source device 200.

As shown in FIG. 2, the communication source device 200 includes an operation unit 1 that receives an operation by a user, a control unit 2, a display unit 3 that performs various display operations, a communication unit (communication means) 4 that performs communication with the SIP server 301 and with the communication destination device 401, and a storage unit 5 that stores data.

Among them, the control unit 2 includes a CPU (Central Processing Unit) 6 that performs various control operations, a ROM (Read Only Memory) 7 that stores a program used for the operation of the CPU 6 and the like, and a RAM (Random Access Memory) that serves as a work area of the CPU 6 and the like.

Examples of the control operations performed by the CPU 6 of the control unit 2 include control for determining a relation discrimination possibility and generating a pseudonymous-name communication identifier according to the determined relation discrimination possibility, as well as display control for causing the display unit 3 to perform a display operation, communication control for causing the communication unit 4 to perform communication, and storage control for causing the storage unit 5 to store data.

The storage unit 5 includes a communication layer information storage area 9, a relation discrimination possibility determination rule storage area 10, an IP address setting storage area 11, and an SIP-URI setting storage area 12.

Among them, the communication layer information storage area (communication layer information storage means) 9 stores and holds communication layer information indicating a communication layer where a communication identifier needs to be converted into a pseudonymous name.

Figure 3:
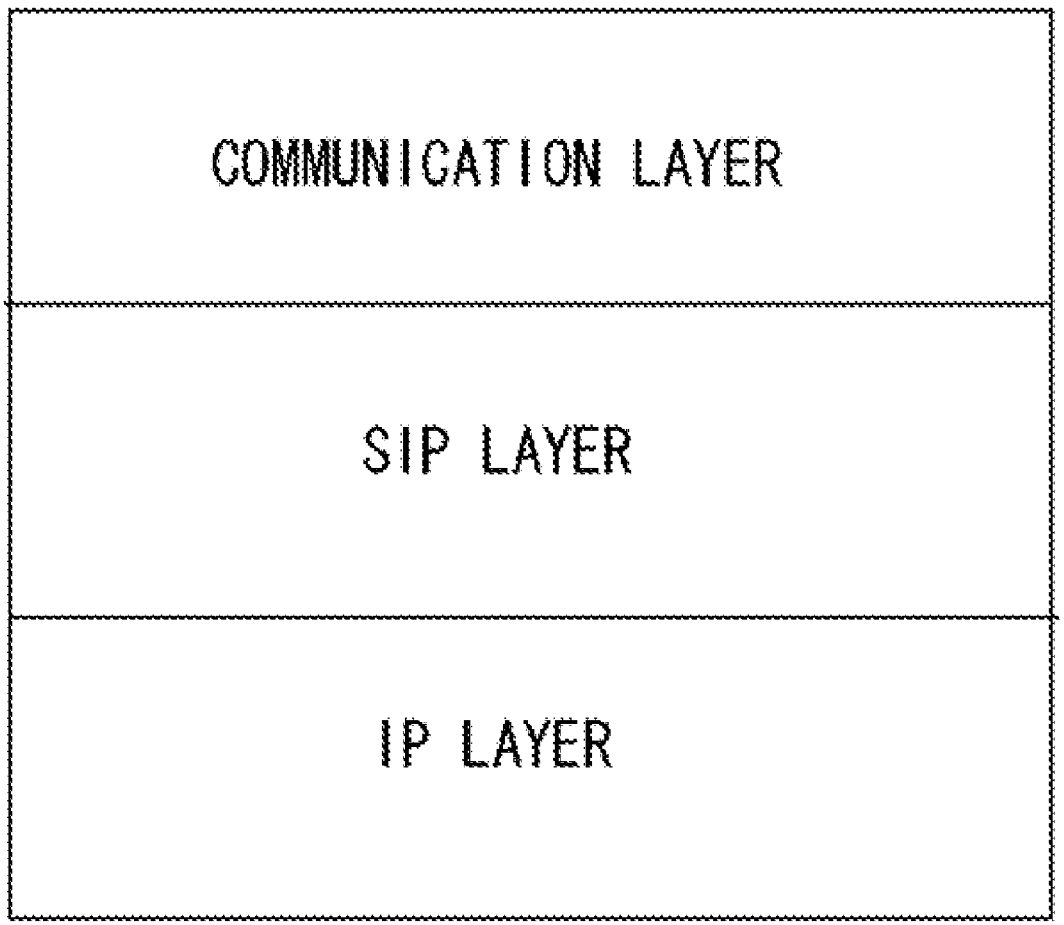
FIG. 3 shows an example of communication layer information.

FIG. 3 shows an example of communication layer information.

As shown in FIG. 3, in this exemplary embodiment, the communication layer information indicates an SIP layer and an IP layer as a communication layer where a communication identifier needs to be converted into a pseudonymous name.

In this example, assume that communication layers in which a communication identifier needs to be converted into a pseudonymous name are described in order from the upper layer in the communication layer information. That is, from the communication layer information shown in FIG. 3, it can be known that the SIP layer is the upper layer and the IP layer is the lower layer.

Further, the relation discrimination possibility determination rule storage area (relation discrimination-property determination rule storage means) 10 stores and holds a relation discrimination possibility determination rule that is used to determine, according to the relation discrimination possibility of a pseudonymous-name communication identifier of an upper layer (specific communication layer), whether the relation discrimination possibility of a pseudonymous-name communication identifier of a lower layer (another communication layer) should be determined as relation discrimination possible or relation discrimination impossible.

FIG. 4 shows an example of a relation discrimination possibility determination rule.

As shown in FIG. 4, in this exemplary embodiment, the relation discrimination possibility determination rule includes first and second rules.

Among them, the first rule is a rule specifying that "if the pseudonymous-name communication identifier of an upper layer is a pseudonymous-name communication identifier whose relation cannot be discriminated, the pseudonymous-name communication identifier of a lower layer should be made relation discrimination impossible" as shown in FIG. 4.

Further, the second rule is a rule specifying that "if the pseudonymous-name communication identifier of an upper layer is a pseudonymous-name communication identifier whose relation can be discriminated, the pseudonymous-name communication identifier of a lower layer should be made relation discrimination possible" as shown in FIG. 4.

The SIP-URI setting storage area 12 stores and holds an SIP-URI of the communication source device 200 used for the communication, which is set according to the relation discrimination possibility of the SIP layer.

Similarly, the IP address setting storage area 11 stores and holds an IP address of the communication source device 200 that is used for the communication, which is set according to the relation discrimination possibility of the IP layer.

Further, the communication unit 4 has a function of communicating with the SIP server 301 by using an SIP-URI read from the SIP-URI setting storage area 12 when communication with the communication destination device 401 is performed in the SIP layer.

Furthermore, the communication unit 4 has a function of communicating with the communication destination device 401 by using an IP address read from the IP address setting storage area 11 when communication with the communication destination device 401 is performed in the IP layer.

Next, an operation is explained.

Figure 5A:
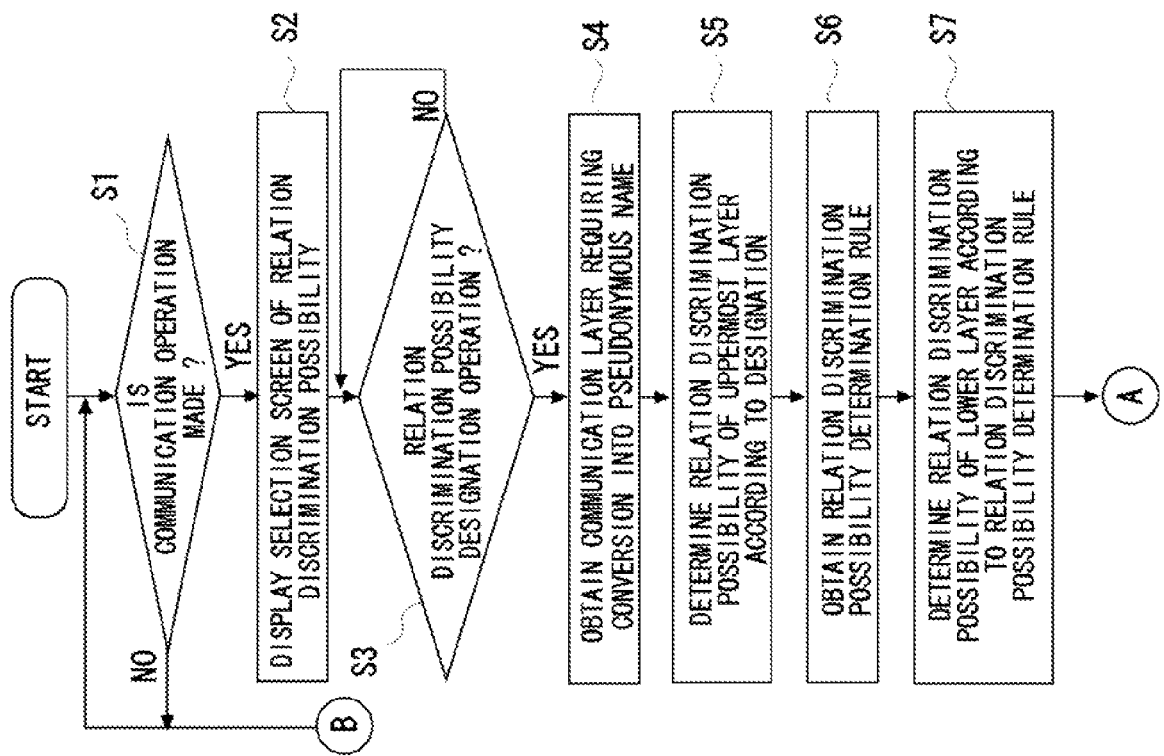
FIG. 5A is a flowchart showing an operation flow of a communication source device in a case of a first exemplary embodiment.
Figure 5B:
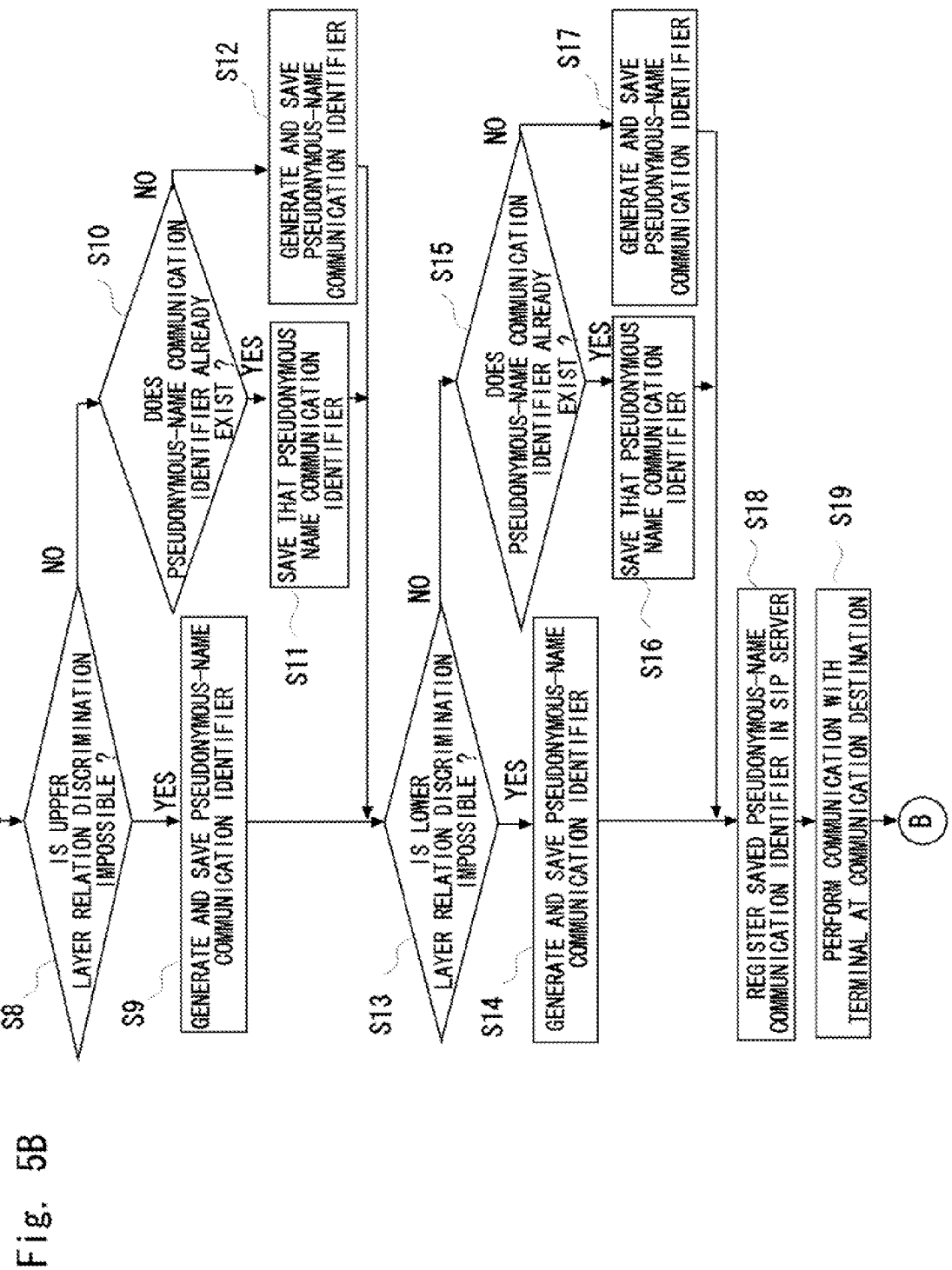
FIG. 5B is a flowchart showing an operation flow of a communication source device in a case of a first exemplary embodiment.

FIGS. 5A and 5B are a flowchart showing an operation flow of the communication source device 200 in the case of this exemplary embodiment.

As shown in FIG. 5A, the CPU 6 of the control unit 2 first monitors whether or not an operation to initiate telephone communication with the communication destination device 401 by using an SIP with a pseudonymous name is made on the operation unit 1 (step S1).

The monitoring in the step S1 is repeated until the operation has been made on the operation unit 1.

When the operation is made on the operation unit 1 (Yes in step S1), the CPU 6 performs control to display a selection screen that lets the user select a relation discrimination possibility that should be applied to the communication to be performed on the display unit 3. As a result, the display unit 3 displays the selection screen (step S2).

In this selection screen, "relation discrimination impossible" or "relation discrimination possible" can be selected as the relation discrimination possibility. That is, at this point, the control unit 2 functions as relation discrimination possibility inquiry means.

Next, the CPU 6 monitors whether or not an operation to designate either one of "relation discrimination impossible" and "relation discrimination possible" as the relation discrimination possibility has been made on the operation unit 1 (step S3).

The monitoring in the step S3 is repeated until the operation to designate either one of "relation discrimination impossible" and "relation discrimination possible" as the relation discrimination possibility is made on the operation unit 1.

When either one of "relation discrimination impossible" and "relation discrimination possible" is specified (Yes in step S3), the CPU 6 obtains and recognizes information indicating a communication layer(s) that requires a conversion into a pseudonymous name by referring to the communication layer information storage area 9 (step S4). That is, at this point, the control unit 2 functions as pseudonymous-name conversion requiring communication layer recognition means.

In the case of this exemplary embodiment, the communication layer requiring a conversion into a pseudonymous name includes an SIP layer and an IP layer as shown in FIG. 3. Note that the CPU 6 also recognizes that the SIP layer, which is described earlier, is the upper layer among these SIP and IP layers.

Next, the CPU 6 determines the relation discrimination possibility of the pseudonymous-name communication identifier of the SIP layer, which is the uppermost layer, according to the relation discrimination possibility designated in the previous step S3 (step S5).

That is, if specified as "relation discrimination impossible" in the previous step S3, the relation discrimination possibility of the pseudonymous-name communication identifier of the SIP layer is determined to "relation discrimination impossible". On the other hand, if specified as "relation discrimination possible" in the previous step S3, the relation discrimination possibility of the pseudonymous-name communication identifier of the SIP layer is determined to "relation discrimination possible". That is, at this point, the control unit 2 functions as relation discrimination possibility determination means.

Next, the CPU 6 obtains a relation discrimination possibility determination rule from the relation discrimination possibility determination rule storage area 10 (step S6).

Next, the CPU 6 determines the relation discrimination possibility of the pseudonymous-name communication identifier of all the lower layers according to the relation discrimination possibility determination rule obtained in the previous step S6 (step S7). That is, at this point, the control unit 2 functions as relation discrimination possibility determination means.

Note that in this exemplary embodiment, since only two layers, i.e., only the SIP layer and the IP layer require a conversion into a pseudonymous name, the uppermost communication layer is the SIP layer and the lower layer includes the IP layer alone. However, when there are a plurality of lower layers, the relation discrimination possibilities of all the lower layers are determined in the step S7.

In the case of this exemplary embodiment, if the relation discrimination possibility of the pseudonymous-name communication identifier of the SIP layer, which is the upper layer, is "relation discrimination impossible" in the step S7, the relation discrimination possibility of the pseudonymous-name communication identifier of the IP layer, which is the lower layer, is determined to "relation discrimination impossible" according to the first rule shown in FIG. 4.

On the other hand, if the relation discrimination possibility of the pseudonymous-name communication identifier of the SIP layer, which is the upper layer, is "relation discrimination possible", the relation discrimination possibility of the pseudonymous-name communication identifier of the IP layer, which is the lower layer, is determined to "relation discrimination possible" according to the second rule shown in FIG. 4.

In the subsequent step S8, the CPU 6 determines whether or not the relation discrimination possibility of the pseudonymous-name communication identifier of the SIP layer, which is the upper layer, is "relation discrimination impossible".

If the relation discrimination possibility of the pseudonymous-name communication identifier of the SIP layer, which is the upper layer, was determined as "relation discrimination impossible" in the previous step S5 (Yes in step S8), the CPU 6 generates a new pseudonymous name SIP-URI whose relation cannot be discriminated and stores the generated pseudonymous-name SIP-URI to the SIP-URI setting storage area 12 (step S9). That is, at this point, the control unit 2 functions as pseudonymous-name communication identifier generation means.

If the relation discrimination possibility of the pseudonymous-name communication identifier of the SIP layer, which is the upper layer, was determined as "relation discrimination possible" in the previous step S5 (No in step S8), the CPU 6 determines whether or not there is any already-used pseudonymous name SIP-URI whose relation can be discriminated (step S10).

If there is an already-used pseudonymous name SIP-URI whose relation can be discriminated (Yes in step S10), the CPU 6 stores that pseudonymous name SIP-URI to the SIP-URI setting storage area 12 (step S11).

Further, if there is no already-used pseudonymous name SIP-URI whose relation can be discriminated (No in step S10), the CPU 6 generates a new pseudonymous name SIP-URI whose relation can be discriminated and stores the generated pseudonymous name SIP-URI to the SIP-URI setting storage area 12 (step S12). That is, at this point, the control unit 2 also functions as pseudonymous-name communication identifier generation means.

In a step S13 subsequent to the steps S9, S11 or S12, the CPU 6 determines whether or not the relation discrimination possibility of the pseudonymous-name communication identifier of the IP layer, which is the lower layer, is "relation discrimination impossible".

If the relation discrimination possibility of the pseudonymous-name communication identifier of the IP layer, which is the lower layer, was determined as "relation discrimination impossible" in the previous step S7 (Yes in step S13), the CPU 6 generates a new pseudonymous name IP address whose relation cannot be discriminated and stores the generated pseudonymous name IP address to the IP address setting storage area 12 (step S14).

If the relation discrimination possibility of the pseudonymous-name communication identifier of the IP layer, which is the lower layer, was determined as "relation discrimination possible" in the previous step S7 (No in step S13), the CPU 6 determines whether or not there is any already-used pseudonymous name IP address whose relation can be discriminated (step S15).

If there is an already-used pseudonymous name IP address whose relation can be discriminated (Yes in step S15), the CPU 6 stores that pseudonymous name IP address to the IP address setting storage area 11 (step S16).

Further, if there is no already-used pseudonymous name IP address whose relation can be discriminated (No in step S15), the CPU 6 generates a new pseudonymous name IP address whose relation can be discriminated and stores the generated pseudonymous name IP address to the IP address setting storage area 12 (step S17).

In a step S18 subsequent to the steps S14, S16 or S17, the CPU 6 obtains the pseudonymous name SIP-URI that is stored in the SIP-URI setting storage area 12 in either one of the previous steps S9, S11 and S12 and the pseudonymous name IP address that is stored in the IP address setting storage area 11 in either one of the previous steps S14, S16 and S17, and performs processing to register these pseudonymous name SIP-URI and pseudonymous name IP address in the SIP server 301 (step S18).

That is, in the step S18, the CPU 6 outputs a command to the communication unit 4, and thereby causes the communication unit 4 to transmit these pseudonymous name SIP-URI and pseudonymous name IP address together with their communication identifier registration request to the SIP server 301.

Upon receiving the pseudonymous name SIP-URI and pseudonymous name IP address as well as their communication identifier registration request from the communication source device 200, the SIP server 301 performs processing to register these pseudonymous name SIP-URI and pseudonymous name IP address as a communication identifier of the communication source device 200.

Further, in a step 19 subsequent to the step S18, the CPU 6 outputs a command to the communication unit 4, and thereby causes the communication unit 4 to establish a communication session between the communication unit 4 and the communication destination device 401.

That is, upon receiving the command from the CPU 6, the communication unit 4 first transmits a massage indicating the establishment of an SIP session in which the pseudonymous name SIP-URI of the communication source device 200 and the SIP-URI of the communication destination device 401 are defined as the communication source and the communication destination respectively to the SIP server 301. In this process, information of the pseudonymous name IP address is included as the IP address of the communication source device 200 that is used to establish a telephone-call session in the massage indicating the SIP session establishment.

Next, the SIP server 301 transmits the received massage indicating the SIP session establishment to the communication destination device 401.

Next, the communication destination device 401 includes information of the IP address of the communication source device 200 in a replay to the massage indicating the SIP session establishment. As a result, a communication session is established between the communication source device 200 and the communication destination device 401.

In this way, the communication source device 200 can perform telephone communication using an SIP with the communication destination device 401.

Next, an operation flow of a case in which the user of the communication source device 200 uses a pseudonymous-name communication identifier whose relation cannot be discriminated as a communication identifier in order to prevent his/her behavior from being traced from the communication destination device 401 based on the communication identifier of the communication source device 200.

Firstly, when the user performs an operation on the operation unit 1 to implement telephone communication with the communication destination device 401 by using an SIP with a pseudonymous name (Yes in step S1), a selection screen of the relation discrimination possibility is displayed on the display unit 3. Therefore, the user selects "relation discrimination impossible" as the relation discrimination possibility (Yes in step S3).

Then, the CPU 6 obtains an SIP layer and an IP layer as a communication layer requiring a conversion into a pseudonymous name, and also recognizes that the SIP layer is the upper layer.

Next, the CPU 6 determines the relation discrimination possibility of the pseudonymous-name communication identifier of the SIP layer, which is the uppermost layer, to "relation discrimination impossible" that was designated in the previous step S3 (step S5).

Next, the CPU 6 obtains a relation discrimination possibility determination rule from the relation discrimination possibility determination rule storage area 10 (step S6), and determines the relation discrimination possibility of the pseudonymous-name communication identifier of the IP layer, which is the lower layer, according to the obtained relation discrimination possibility determination rule (step S7).

At this point, since the relation discrimination possibility of the pseudonymous-name communication identifier of the SIP layer, which is the upper layer, is "relation discrimination impossible", the relation discrimination possibility of the pseudonymous-name communication identifier of the IP layer, which is the lower layer, is also determined to "relation discrimination impossible" according to the first rule shown in FIG. 4.

Next, since the relation discrimination possibility of the pseudonymous-name communication identifier of the SIP layer, which is the upper layer, is "relation discrimination impossible" (Yes in step S8), the CPU 6 generates a new pseudonymous name SIP-URI whose relation cannot be discriminated and stores the generated pseudonymous name SIP-URI to the SIP-URI setting storage area 12 (step S9).

Next, since the relation discrimination possibility of the pseudonymous-name communication identifier of the IP layer, which is the lower layer, is "relation discrimination impossible" (Yes in step S13), the CPU 6 generates a new pseudonymous name IP address whose relation cannot be discriminated and stores the generated pseudonymous name IP address to the IP address setting storage area 12 (step S14).

Next, the CPU 6 obtains the pseudonymous name SIP-URI that is stored in the SIP-URI setting storage area 12 in the previous step S9 and the pseudonymous name IP address that is stored in the IP address setting storage area 11 in the previous step S14, and performs processing to register these pseudonymous name SIP-URI and pseudonymous name IP address in the SIP server 301 (step S18).

That is, in the step S18, the CPU 6 outputs a command to the communication unit 4, and thereby causes the communication unit 4 to transmit these pseudonymous name SIP-URI and pseudonymous name IP address together with their communication identifier registration request to the SIP server 301.

Upon receiving the pseudonymous name SIP-URI and pseudonymous name IP address as well as their communication identifier registration request from the communication source device 200, the SIP server 301 performs processing to register these pseudonymous name SIP-URI and pseudonymous name IP address as a communication identifier of the communication source device 200.

Further, in a step 19 subsequent to the step S18, the CPU 6 outputs a command to the communication unit 4, and thereby causes the communication unit 4 to establish a communication session between the communication unit 4 and the communication destination device 401.

That is, upon receiving the command from the CPU 6, the communication unit 4 first transmits a massage indicating the establishment of an SIP session in which the pseudonymous name SIP-URI of the communication source device 200 and the SIP-URI of the communication destination device 401 are defined as the communication source and the communication destination respectively to the SIP server 301. In this process, information of the pseudonymous name IP address is included as the IP address of the communication source device 200 that is used to establish a telephone-call session in the massage indicating the SIP session establishment.

Next, the SIP server 301 transmits the received massage indicating the SIP session establishment to the communication destination device 401.

Next, the communication destination device 401 includes information of the IP address of the communication source device 200 in a replay to the massage indicating the SIP session establishment. As a result, a communication session is established between the communication source device 200 and the communication destination device 401.

In this way, the communication source device 200 can perform telephone communication using an SIP with the communication destination device 401 by using a pseudonymous-name communication identifier whose relation cannot be discriminated as the communication identifier.

In accordance with the first exemplary embodiment described above, the communication source device 200 includes a communication unit 4 capable of performing communication configured from a plurality of communication layers by using a pseudonymous-name communication identifier in a communication layer where a communication identifier needs to be converted into a pseudonymous name, and a control unit 2 that functions as relation discrimination possibility determination means to determine a relation discrimination possibility of a pseudonymous-name communication identifier of a communication layer where a communication identifier needs to be converted into a pseudonymous name when communication is performed by the communication unit 4. Further, the control unit 2 determines a relation discrimination possibility of a pseudonymous-name communication identifier of a specific communication layer (to be more specific, an SIP layer, which is the uppermost layer) among the plurality of communication layers to one of relation discrimination possible and relation discrimination impossible that is designated by a user, and determines whether a relation discrimination possibility of a pseudonymous-name communication identifier of another communication layer (to be more specific, an IP layer) among the plurality of communication layers should be relation discrimination possible or relation discrimination impossible according to which one of relation discrimination possible and relation discrimination impossible the pseudonymous-name communication identifier of the specific communication layer is. Therefore, the problem that a communication source device can be uniquely identified due to mismatch of the pseudonymous-name communication identifier of each communication layer can be solved.

Second Exemplary Embodiment

FIG. 6 is a block diagram showing a configuration of a communication system 100 in accordance with a second exemplary embodiment.

In the above-described first exemplary embodiment, an example in which the IP address of the communication source device 200 can be freely changed and a pseudonymous name IP address is generated in the communication source device 200 is explained. In contrast to the first exemplary embodiment, in the second exemplary embodiment, an example in which the IP address of the communication source device 200 cannot be freely changed and a pseudonymous name IP address is implemented by providing IP layer relay devices (relay devices) 501, 502 and 503 that relay communication performed between the communication source device 200 and the communication destination device 401 in the IP layer is explained.

That is, the communication source device 200 and relay devices 501, 502 and 503 constitute a communication device in the present invention. Therefore, in the second exemplary embodiment, the communication destination device 401 does not directly communicate with the communication source device 200, but communicates with IP layer relay devices 501 to 503. Therefore, the IP address of the communication source device 200 can be concealed from the communication destination device 401.

In this exemplary embodiment, the IP layer relay devices 501 to 503 have a function of communicating with the communication source device 200 and with the communication destination device 401. Further, the communication destination device 401 has a function of communicating with the IP layer relay devices 501 to 503.

Further, the IP layer relay devices 501 to 503 have a function of relaying communication between the communication source device 200 and the communication destination device 401. That is, when data is to be sent from the communication source device 200 to the communication destination device 401, the operation is performed as follows. The communication source device 200 and the IP layer relay devices 501 to 503 first perform communication to send the data from the communication source device 200 to the IP layer relay devices 501 to 503, and after that, the IP layer relay devices 501 to 503 and the communication destination device 401 perform communication to send the data from the IP layer relay devices 501 to 503 to the communication destination device 401.

Further, the IP addresses of the communication source device 200 and the communication destination device 401 are registered in advance in the IP layer relay devices 501 to 503. Furthermore, the IP layer relay devices 501 to 503 are configured so that data transmitted from the IP address of the communication source device 200 is sent to the communication destination device 401 while data transmitted from the IP address of the communication destination device 401 is sent to the communication source device 200.

Figure 7:
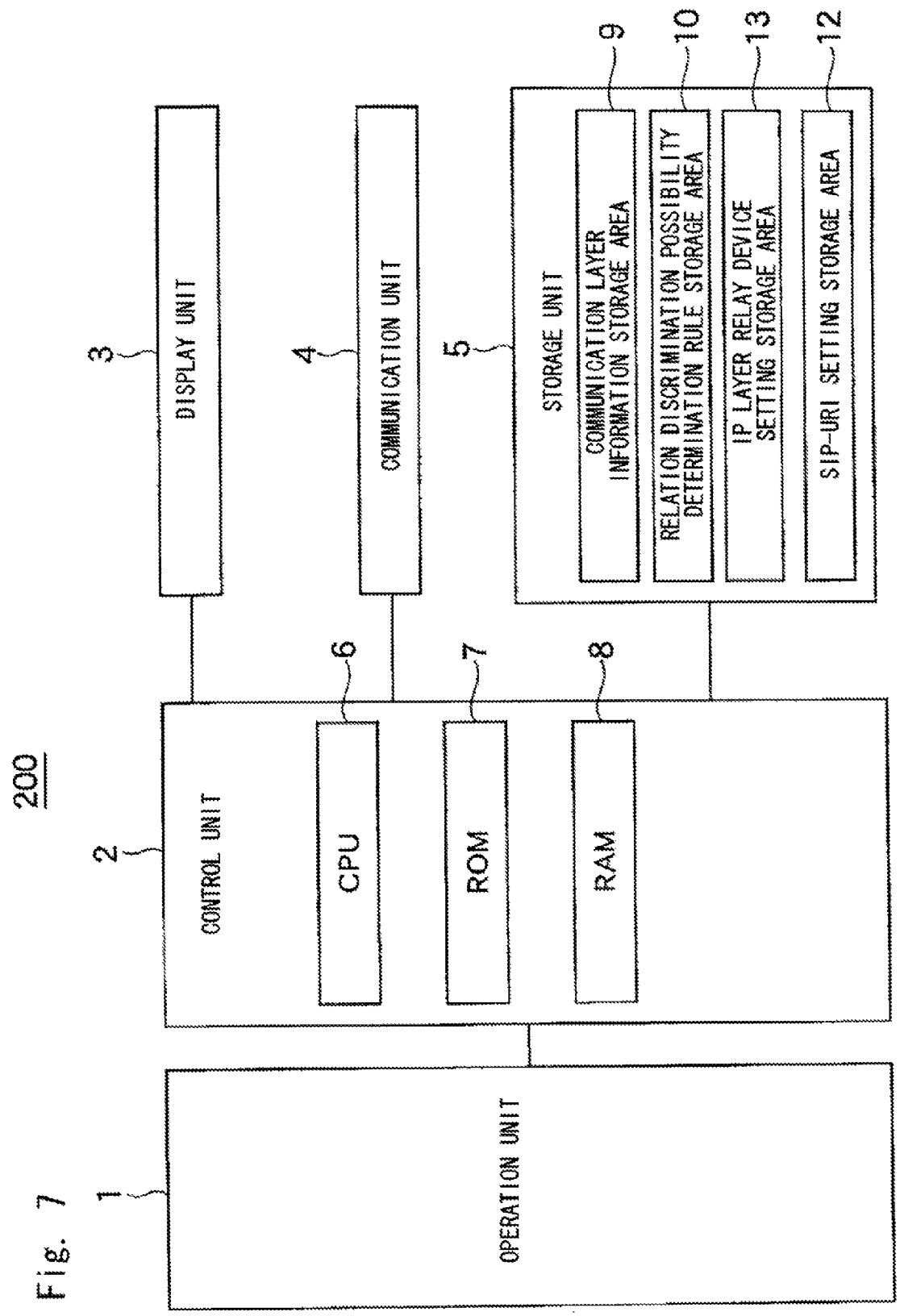
FIG. 7 is a block diagram showing a configuration of a communication source device in accordance with a second exemplary embodiment.

FIG. 7 is a block diagram showing a configuration of the communication source device 200 in accordance with a second exemplary embodiment.

As shown in FIG. 7, the communication source device 200 in accordance with this exemplary embodiment is different from the communication source device 200 in accordance with the above-described first exemplary embodiment in that the communication source device 200 in accordance with this exemplary embodiment includes an IP layer relay device setting storage area 13 in place of the IP address setting storage area 11 (FIG. 2).

The IP layer relay device setting storage area 13 stores and holds a communication identifier of each of the IP layer relay devices 501 to 503. These communication identifies are used when the communication unit 4 performs communication in the IP layer.

Next, an operation is explained.

Figure 8A:
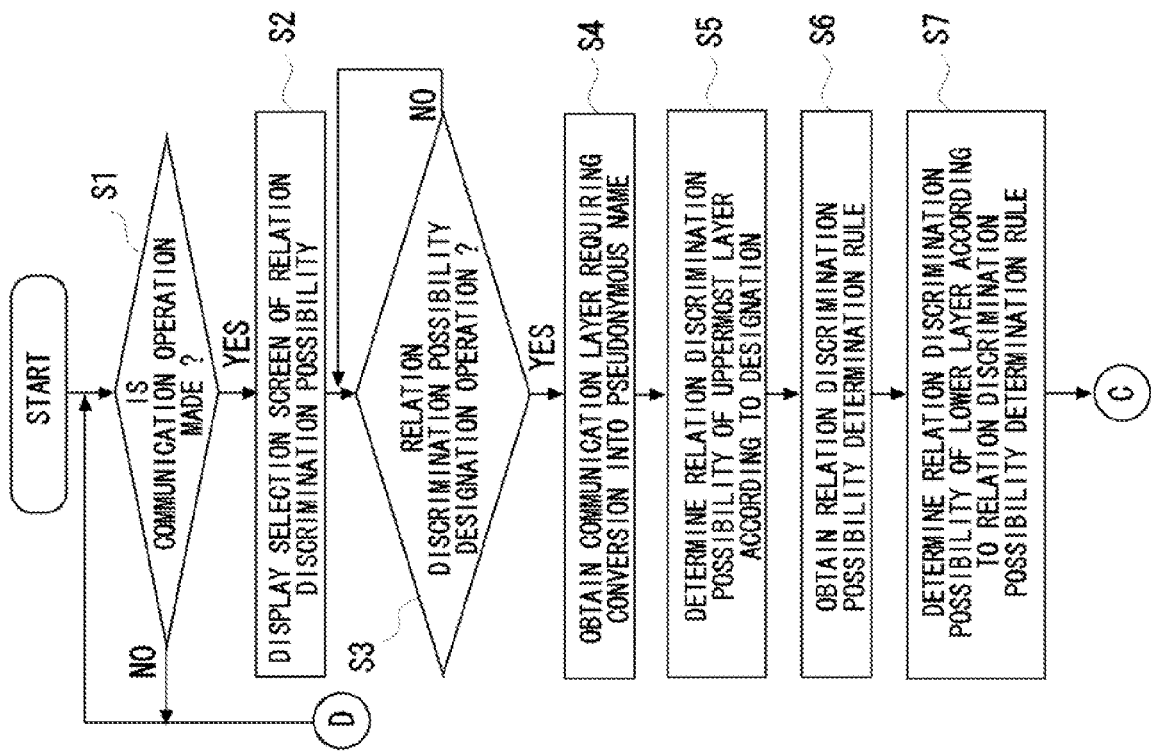
FIG. 8A is a flowchart showing an operation flow of a communication source device in a case of a second exemplary embodiment.
Figure 8B:
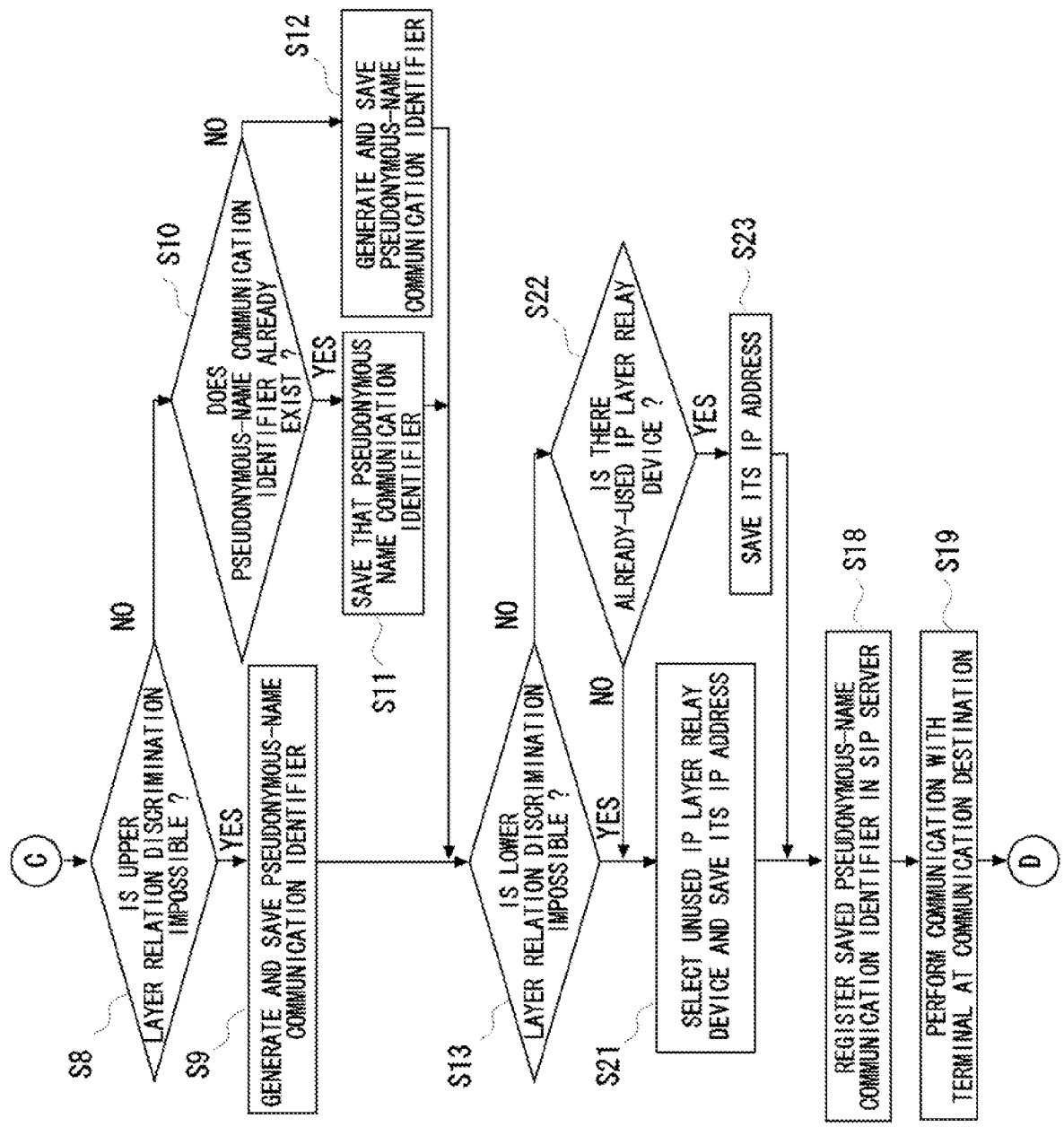
FIG. 8B is a flowchart showing an operation flow of a communication source device in a case of a second exemplary embodiment.

FIGS. 8A and 8B are a flowchart showing an operation flow of the communication source device 200 in the case of this exemplary embodiment.

The operations of this exemplary embodiment are similar to those of the above-described first exemplary embodiment until the step S13, and therefore their explanation is omitted.

In the case of this exemplary embodiment, If the relation discrimination possibility of the pseudonymous-name communication identifier of the IP layer, which is the lower layer, was determined as "relation discrimination impossible" in the previous step S7 (Yes in step S13), the CPU 6 selects one IP layer relay device that is not used from the IP layer relay devices 501 to 503 and stores the IP address of the selected IP layer relay device to the IP layer relay device setting unit 13 (step S21).

On the other hand, if the relation discrimination possibility of the pseudonymous-name communication identifier of the IP layer, which is the lower layer, was determined as "relation discrimination possible" in the previous step S7 (No in step S13), the CPU 6 determines whether or not there is any IP layer relay device (one of the IP layer relay devices 501 to 503) that has been already used (step S22).

If there is an already-used IP layer relay device (one of the IP layer relay devices 501 to 503) (Yes in step S22), the CPU 6 stores the IP address of that IP layer relay device to the IP layer relay device setting unit 13 again (step S23).

Further, if there is no already-used IP layer relay device (one of the IP layer relay devices 501 to 503) (No in step S22), the CPU 6 selects one IP layer relay device that is not used from the IP layer relay devices 501 to 503 and stores the IP address of the selected IP layer relay device to the IP layer relay device setting unit 13 (step S21).

In a step S18 subsequent to the steps S21 or S23, the CPU 6 obtains the pseudonymous name SIP-URI that is stored in the SIP-URI setting storage area 12 in either one of the previous steps S9, S11 and S12 and the IP address of the IP layer relay device that is stored in the IP layer relay device setting storage area 13 in the previous step S21 or S23, and performs processing to register these pseudonymous name SIP-URI and the IP address in the SIP server 301 (step S18).

That is, in the step S18, the CPU 6 outputs a command to the communication unit 4, and thereby causes the communication unit 4 to transmit these pseudonymous name SIP-URI and IP address together with their communication identifier registration request to the SIP server 301.

Upon receiving the pseudonymous name SIP-URI and the IP address of the IP layer relay device as well as their communication identifier registration request from the communication source device 200, the SIP server 301 performs processing to register the pseudonymous name SIP-URI as the communication identifier of the communication source device 200 and register the IP address as the communication identifier of the IP layer relay device that relays the communication of the communication source device 200.

Further, in a step 19 subsequent to the step S18, the CPU 6 outputs a command to the communication unit 4, and thereby causes the communication unit 4 to establish a communication session between the communication unit 4 and the communication destination device 401.

That is, upon receiving the command from the CPU 6, the communication unit 4 first transmits a massage indicating the establishment of an SIP session in which the pseudonymous name SIP-URI of the communication source device 200 and the SIP-URI of the communication destination device 401 are defined as the communication source and the communication destination respectively to the SIP server 301. In this process, information of the IP address of the IP layer relay device stored in the IP layer relay device setting storage area 13 is included as the IP address of the communication source device 200 that is used to establish a telephone-call session in the massage indicating the SIP session establishment.

Next, the SIP server 301 transmits the received massage indicating the SIP session establishment to the communication destination device 401.

Next, the communication destination device 401 includes information of the IP address of the communication source device 200 in a replay to the massage indicating the SIP session establishment. As a result, a communication session is established between the selected IP layer relay device and the communication source device 200.

In this way, a communication session is established between the selected IP layer relay device and the communication destination device 401, and the selected IP layer relay device relays the communication. By doing so, the telephone call data arrives at the communication source device 200 and, as a result, the telephone call can be performed between the communication source device 200 and the communication destination device 401.

In accordance with the second exemplary embodiment described above, by using the IP layer relay devices 501 to 503, it becomes possible to selectively use a pseudonymous-name communication identifier whose relation cannot be discriminated or a pseudonymous-name communication identifier whose relation can be discriminated in an IP layer even when the IP address of the communication source device 200 cannot be freely changed.

Third Exemplary Embodiment

In a third exemplary embodiment, an example in which the communication layer where a communication identifier needs to be converted into a pseudonymous name can be changed according to the type of communication is explained.

A configuration of a communication system 100 in accordance with this exemplary embodiment is similar to that of the above-described first exemplary embodiment (FIG. 1).

Figure 9:
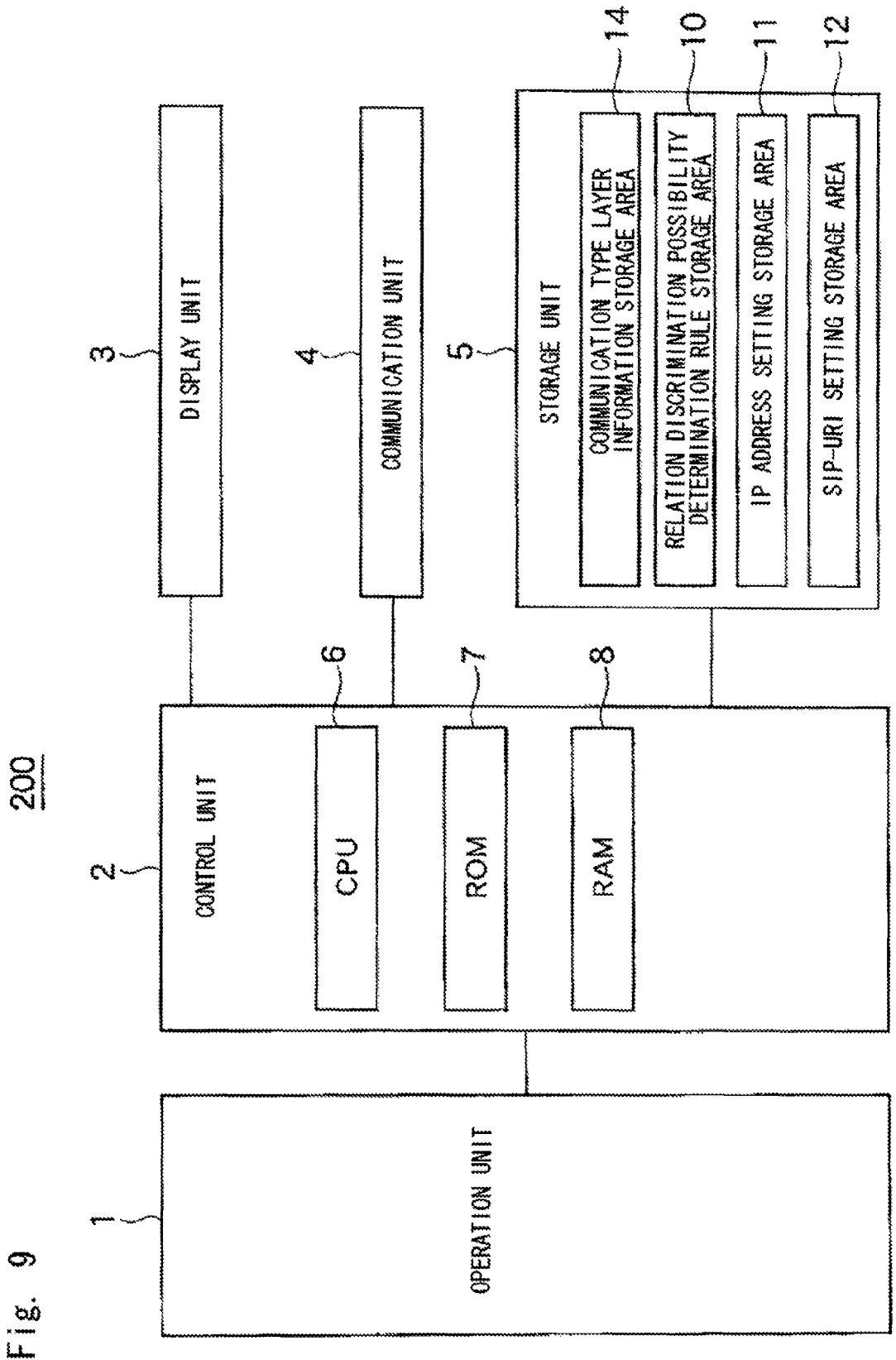
FIG. 9 is a block diagram showing a configuration of a communication system in accordance with a third exemplary embodiment.

Further, FIG. 9 is a block diagram showing a configuration of a communication source device 200 in accordance with this exemplary embodiment.

As shown in FIG. 9, the communication source device 200 in accordance with this exemplary embodiment is different from the communication source device 200 in accordance with the above-described first exemplary embodiment in that the communication source device 200 in accordance with this exemplary embodiment includes a communication type layer information storage area (communication type layer information storage means) 14 in place of the communication layer information storage area 9 (FIG. 2).

FIG. 10 shows an example of communication type layer information stored in the communication type layer information storage area 14.

As shown in FIG. 10, the communication type layer information indicates a correspondence relation between types of communication that the communication unit 3 can perform and communication layers where a communication identifier needs to be converted into a pseudonymous name among a plurality of communication layers.

That is, for example, when the communication type is an SIP phone, the communication layer requiring a conversion into a pseudonymous name includes an SIP layer and an IP layer as shown in FIG. 10. Assume that the communication layers in which a communication identifier needs to be converted into a pseudonymous name are also described in order from the upper layer in the communication type layer information. That is, from the communication type layer information shown in FIG. 10, it can be known that the SIP layer is the upper layer and the IP layer is the lower layer.

Further, as shown in FIG. 10, when the communication type is a mail (email), the communication layer requiring a conversion into a pseudonymous name is an SMTP (Simple Mail Transfer Protocol) layer, which is a layer where mails are delivered.

Next, an operation is explained.

Figure 11A:
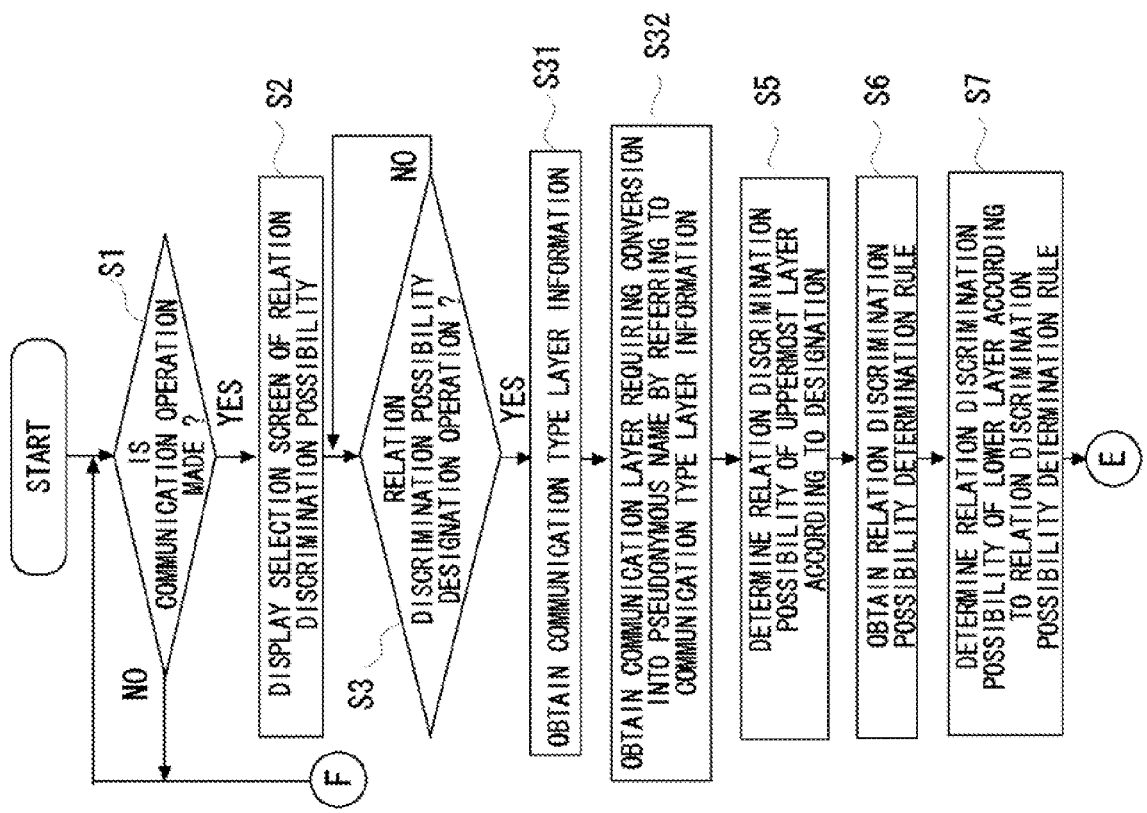
FIG. 11A is a flowchart showing an operation flow of a communication source device in a case of a third exemplary embodiment.
Figure 11B:
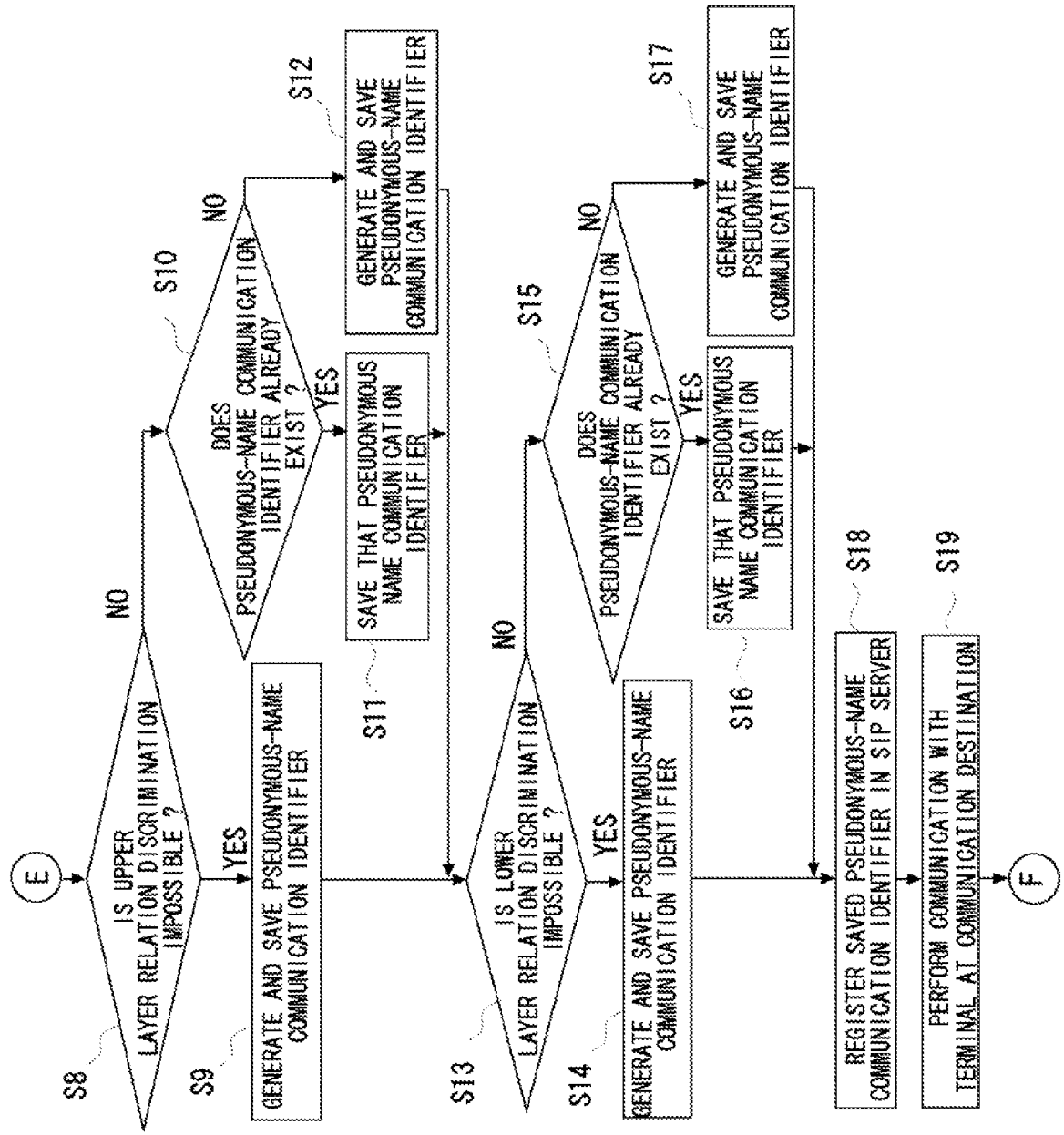
FIG. 11B is a flowchart showing an operation flow of a communication source device in a case of a third exemplary embodiment.

FIGS. 11A and 11B are a flowchart showing an operation flow of the communication source device 200 in the case of this exemplary embodiment.

As shown in FIG. 11A, the operation of this exemplary embodiment is different from that of the above-described first exemplary embodiment only in that step S31 and S32 are performed instead of the step S4 (FIG. 5A).

That is, in case of this exemplary embodiment, after the steps S1 to S3 are performed in a similar manner to those of the above-described first exemplary embodiment, the CPU 6 obtains communication type layer information from the communication type layer information storage area 14 in the step S31.

In the subsequent step S32, the CPU 6 obtains information indicating a communication layer requiring a conversion into a pseudonymous name by referring to the communication type layer information. In this point, assume that whether the operation is an operation for performing an SIP phone or an operation for performing email transmission is already known in the previous step S1. Then, if it is an operation for performing an SIP phone, the SIP layer and the IP layer are obtained as a communication layer requiring a conversion into a pseudonymous name as shown in FIG. 10.

The operations in the step S5 and subsequent steps of this exemplary embodiment, which are performed after the step S32, are similar to those of the above-described first exemplary embodiment, and therefore their explanation is omitted.

In accordance with the third exemplary embodiment described above, the communication layer requiring a conversion into a pseudonymous name can be changed according to the type of communication. Therefore, the relation discrimination possibility of a pseudonymous-name identifier can be controlled not only when the communication unit 4 performs a telephone call with an SIP but also when the communication unit 4 performs other types of communication.

Fourth Exemplary Embodiment

In a fourth exemplary embodiment, an example in which the communication layer requiring a conversion into a pseudonymous name can be changed according to the party on the other end of the communication is explained.

A configuration of a communication system 100 in accordance with this exemplary embodiment is similar to that of the above-described first exemplary embodiment (FIG. 1).

Figure 12:
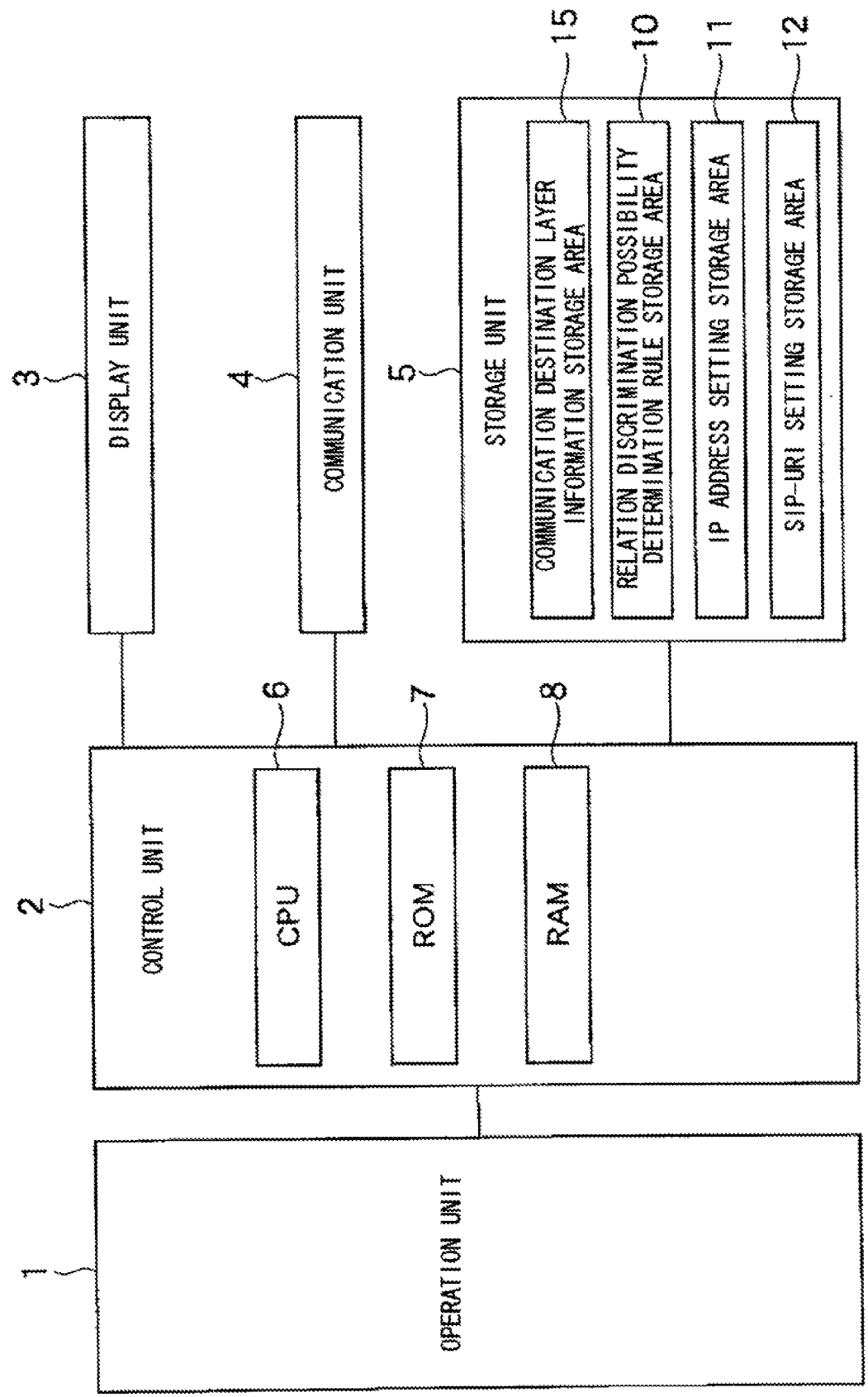
FIG. 12 is a block diagram showing a configuration of a communication system in accordance with a fourth exemplary embodiment.

Further, FIG. 12 is a block diagram showing a configuration of a communication source device 200 in accordance with this exemplary embodiment.

As shown in FIG. 12, the communication source device 200 in accordance with this exemplary embodiment is different from the communication source device 200 in accordance with the above-described first exemplary embodiment in that the communication source device 200 in accordance with this exemplary embodiment includes a communication destination layer information storage area (communication destination layer information storage means) 15 in place of the communication layer information storage area 9 (FIG. 2).

FIG. 13 shows an example of communication destination layer information stored in the communication destination layer information storage area 15.

As shown in FIG. 13, the communication destination layer information indicates a correspondence relation between communication identifiers of the communication destination device 401 and communication layers where a communication identifier needs to be converted into a pseudonymous name among a plurality of communication layers.

That is, for example, when the communication identifier of the communication destination device 401 is "10.10.10.10", the communication layer requiring a conversion into a pseudonymous name includes an SIP layer and an IP layer as shown in FIG. 13.

Further, when the communication identifier of the communication destination device 401 is "192.168.1.1" to "192.168.1.255", the communication layer requiring a conversion into a pseudonymous name includes an SIP layer, an IP layer, and an Ethernet MAC layer ("Ethernet" is a registered trademark).

Assume that the communication layers in which a communication identifier needs to be converted into a pseudonymous name are also described in order from the upper layer in the communication destination layer information. That is, from the communication destination layer information shown in FIG. 13, it can be known that the SIP layer is the uppermost communication layer; the IP layer is a lower communication layer; and the Ethernet MAC layer is a communication layer lower than the IP layer.

Next, an operation is explained.

Figure 14A:
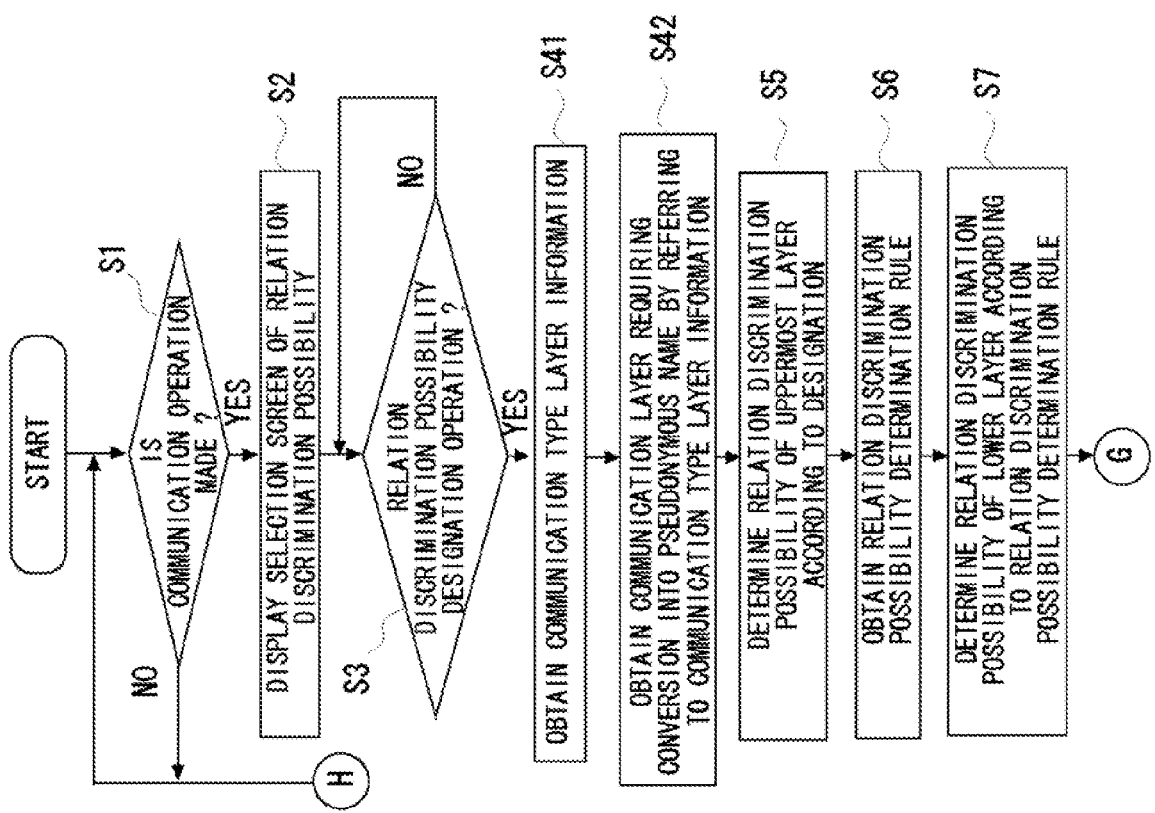
FIG. 14A is a flowchart showing an operation flow of a communication source device in a case of a fourth exemplary embodiment.
Figure 14B:
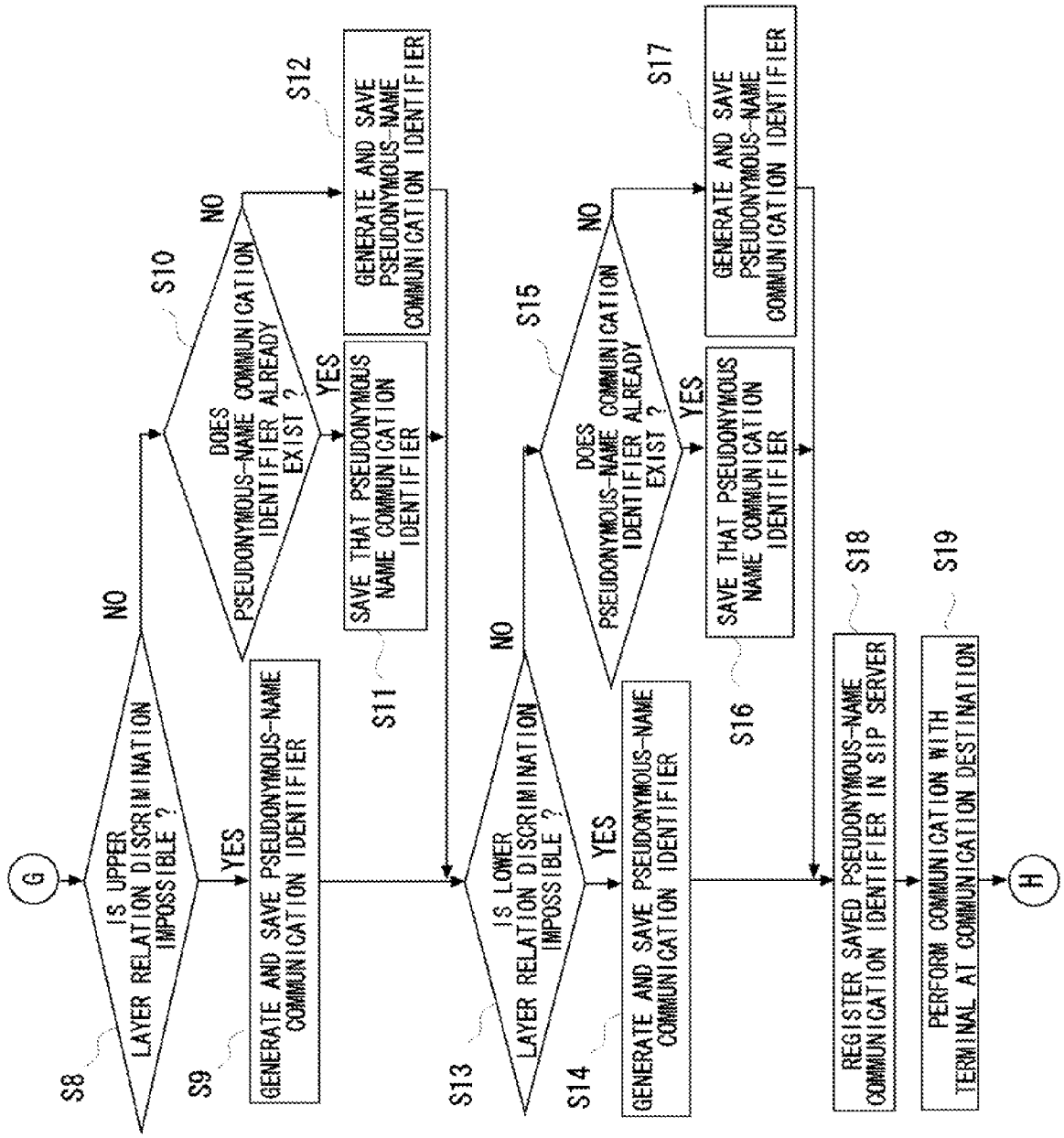
FIG. 14B is a flowchart showing an operation flow of a communication source device in a case of a fourth exemplary embodiment.

FIG. 14 is a flowchart showing an operation flow of the communication source device 200 in the case of this exemplary embodiment.

As shown in FIG. 14, the operation of this exemplary embodiment is different from that of the above-described first exemplary embodiment only in that step S41 and S42 are performed instead of the step S4 (FIG. 5A).

That is, in case of this exemplary embodiment, after the steps S1 to S3 are performed in a similar manner to those of the above-described first exemplary embodiment, the CPU 6 obtains communication destination layer information from the communication destination layer information storage area 15 in the step S41.

In the subsequent step S42, the CPU 6 obtains information indicating the communication layer requiring a conversion into a pseudonymous name by referring to the communication destination layer information. In this point, assume that the communication destination has been already designated in the previous step S1. Therefore, the CPU 6 has already recognized the communication identifier of the communication destination device 401. If "10.10.10.10" has been designated as the communication identifier of the communication destination device 401, the SIP layer and the IP layer are obtained as a communication layer requiring a conversion into a pseudonymous name as shown in FIG. 13.

Note that if any communication identifier between "192.168.1.1" and "192.168.1.255" is designated as the communication identifier of the communication destination device 401, the SIP layer, the IP layer, and the Ethernet MAC layer are obtained as a communication layer requiring a conversion into a pseudonymous name as shown in FIG. 13.

The operations in the step S5 and subsequent steps of this exemplary embodiment, which are performed after the step S42, are similar to those of the above-described first exemplary embodiment, and therefore their explanation is omitted.

Note that if the three layers, i.e., the SIP layer, the IP layer, and the Ethernet MAC layer are obtained as the communication layer requiring a conversion into a pseudonymous name, the relation discrimination possibilities of the two lower layers (IP layer and Ethernet MAC layer) are determined in the step S7.

In accordance with the fourth exemplary embodiment described above, the communication layer requiring a conversion into a pseudonymous name can be changed according to the party on the other end of the communication. Therefore, for example, when the communication destination device 401 is located on the same network as the communication source device 200, a pseudonymous-name communication identifier can be used even in a further lower communication layer.

Fifth Exemplary Embodiment

In a fifth exemplary embodiment, an example in which the relation discrimination possibility is determined according to the possibility that the communication source device 200 is transferred is explained.

A configuration of a communication system 100 in accordance with this exemplary embodiment is similar to that of the above-described first exemplary embodiment (FIG. 1).

Figure 15:
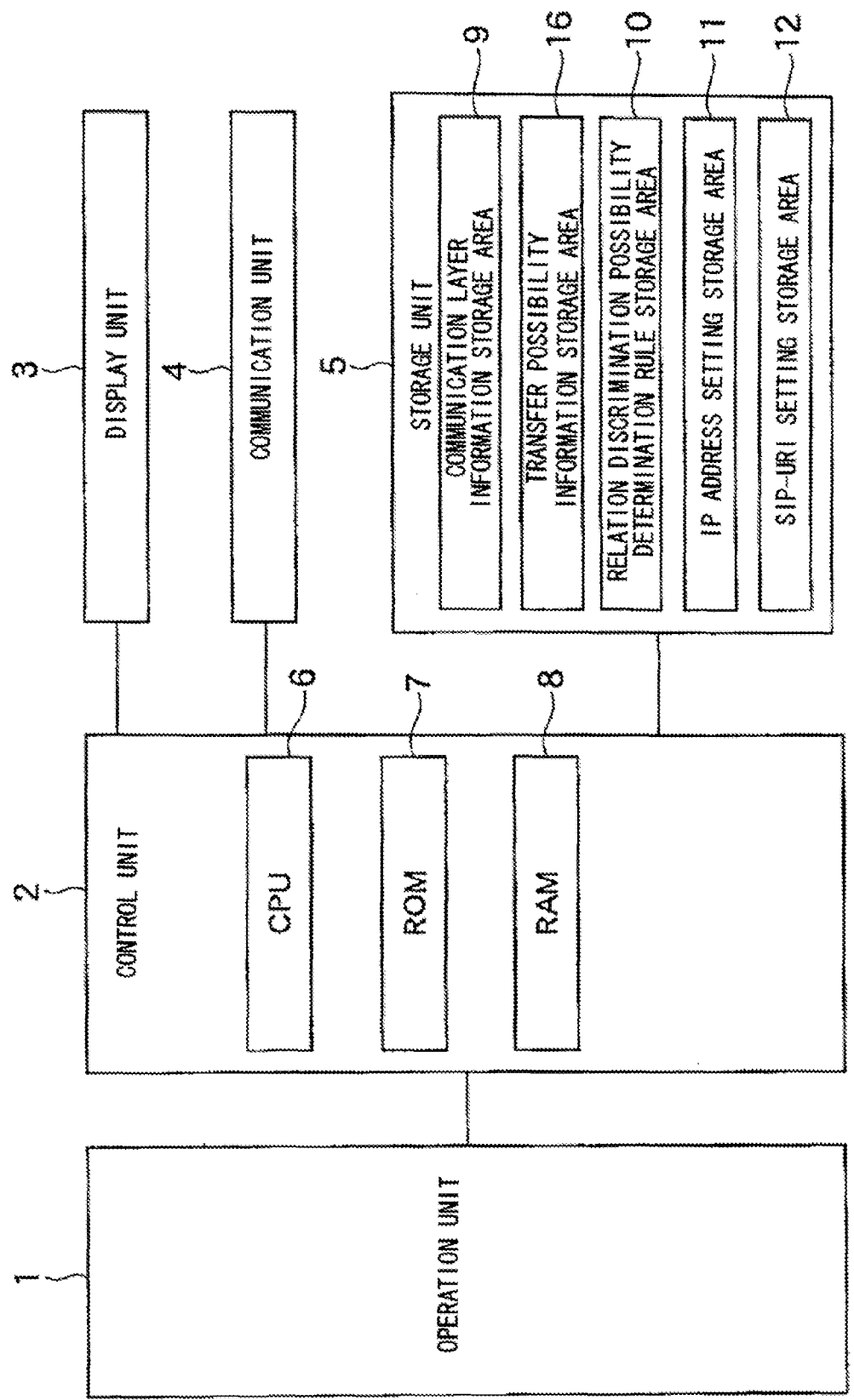
FIG. 15 is a block diagram showing a configuration of a communication system in accordance with a fifth exemplary embodiment.

Further, FIG. 15 is a block diagram showing a configuration of a communication source device 200 in accordance with this exemplary embodiment.

As shown in FIG. 15, the communication source device 200 in accordance with this exemplary embodiment is different from the communication source device 200 in accordance with the above-described first exemplary embodiment (FIG. 2) in that the communication source device 200 in accordance with this exemplary embodiment further includes a transfer possibility information storage area (transfer plan information storage means) 16.

In the transfer possibility information storage area 16, transfer possibility information that indicates whether or not there is a possibility that the communication source device 200 is transferred is stored and held. Examples of this transfer possibility information include information indicating a travel plan of a user of the communication source device 200.

Further, FIG. 16 shows an example of a relation discrimination possibility determination rule stored and held in a relation discrimination possibility determination rule storage area 10 in accordance with this exemplary embodiment.

As shown in FIG. 16, in the case of this exemplary embodiment, the relation discrimination possibility determination rule storage area 10 stores a third rule in addition to a first rule that is similar to that of the above-described first exemplary embodiment.

As shown in FIG. 16, the third rule is a rule specifying that "if there is a possibility of a transfer and the pseudonymous-name communication identifier of an upper layer is a pseudonymous-name communication identifier whose relation can be discriminated, the pseudonymous-name communication identifier of a lower layer should be made relation discrimination possible".

Next, an operation is explained.

Figure 17A:
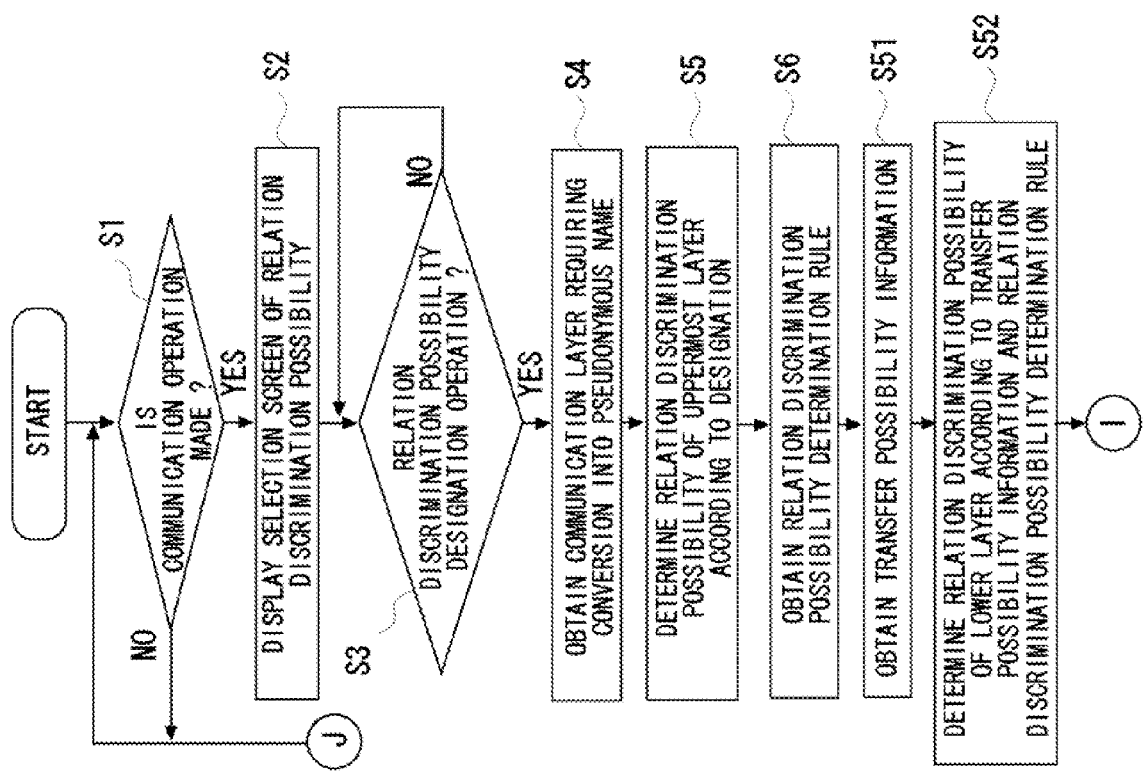
FIG. 17A is a flowchart showing an operation flow of a communication source device in a case of a fifth exemplary embodiment.
Figure 17B:
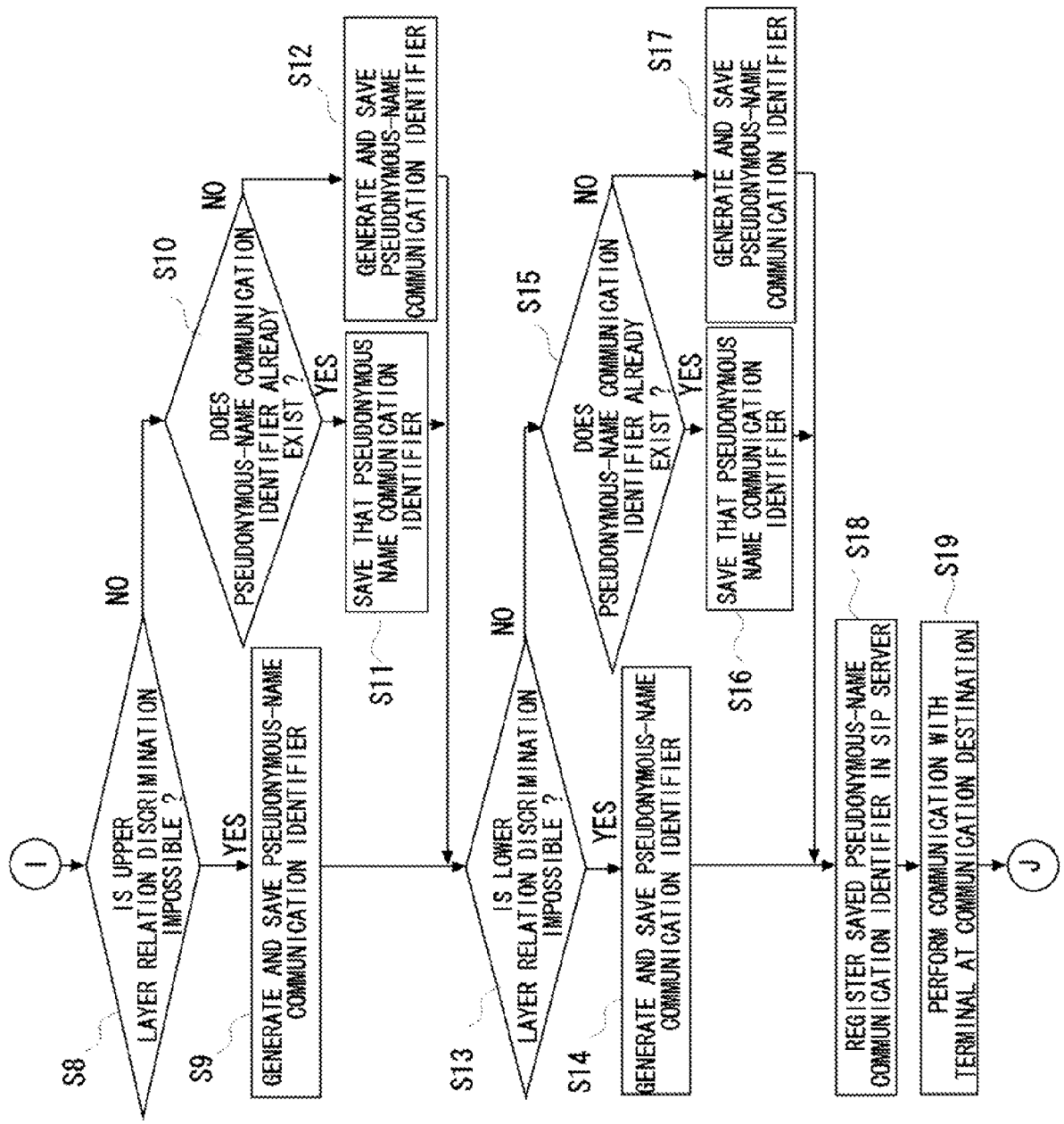
FIG. 17B is a flowchart showing an operation flow of a communication source device in a case of a fifth exemplary embodiment.

FIGS. 17A and 17B are a flowchart showing an operation flow of the communication source device 200 in the case of this exemplary embodiment.

As shown in FIG. 17A, the operation of this exemplary embodiment is different from that of the above-described first exemplary embodiment only in that step S51 and S52 are performed instead of the step S7 (FIG. 5A).

That is, in the case of this exemplary embodiment, after the steps S1 to S6 are performed in a similar manner to those of the above-described first exemplary embodiment, the CPU 6 obtains transfer possibility information from the transfer possibility information storage area 16 and recognizes its contents in the step S51. That is, at this point, the control unit 2 functions as transfer plan recognition means.

In the subsequent step S52, the CPU 6 determines the relation discrimination possibility of the pseudonymous-name communication identifier of the lower layer according to the relation discrimination possibility determination rule obtained in the previous step 6 (in the case of this exemplary embodiment, first and third rules as shown in FIG. 16) and the transfer possibility information obtained in the previous step S51.

For example, when information "there is a possibility of a transfer" is stored in the transfer possibility information storage area 16, the CPU 6 tries the adaptation of the third rule (FIG. 16). That is, in this case, the pseudonymous-name communication identifier of the upper layer has been determined as the relation discrimination possible in the previous step S5, the third rule can be adapted and the pseudonymous-name communication identifier of the lower layer is thereby also determined to the "relation discrimination possible".

In accordance with the fifth exemplary embodiment described above, the relation discrimination possibility of the lower layer is determined according to the possibility that the communication source device 200 is transferred. Therefore, for example, when the communication source device 200 is a mobile terminal, the problem that "traveling of the user can be surmised by the communication destination device 401 based on the IP address change by roaming" can be solved by storing information "there is a possibility of a transfer" in the transfer possibility information storage area 16.

Note that although an example in which the specific communication layer is an upper layer (uppermost layer) is explained in each of the above-described exemplary embodiments, the specific communication layer may be a layer other than the upper layer (layer other than the uppermost layer). Further, although the rule specifying that the relation discrimination possibilities of the communication layers where a communication identifier needs to be converted into a pseudonymous name should be made the same with each other is used as the relation discrimination-property determination rule in each of the above-described exemplary embodiments, a rule specifying that the communication layers where a communication identifier needs to be converted into a pseudonymous name are set to different relation discrimination possibilities in an alternate manner may be also used.

Further, although an example in which the relation discrimination possibility of a pseudonymous-name communication identifier used by the communication source device 200 for communication is determined in the communication source device 200 is explained in each of the above-described exemplary embodiments, the relation discrimination possibility of a pseudonymous-name communication identifier used by the communication source device 200 for communication may be determined in a device for determining a relation determination possibility of a pseudonymous-name communication identifier that is provided outside the communication source device 200. In such a case, similarly to each of the above-described exemplary embodiments, when the relation discrimination possibility is designated by a user in the communication source device 200, the specified relation discrimination possibility is notified from the communication source device 200 to the relation discrimination possibility determination device. Upon receiving the notification, the relation discrimination possibility determination device determines the relation discrimination possibility of a pseudonymous-name communication identifier according to the notified relation discrimination possibility (i.e., designated relation discrimination possibility) by a similar operation to that performed in the communication source device 200 in each of the above-described exemplary embodiments, and notifies the determined relation discrimination possibility to the communication source device 200. The communication source device 200 performs processes of the step S8 and subsequent steps in each of the above-described exemplary embodiments according to the notified relation discrimination possibility.

Further, an example in which when a pseudonymous-name communication identifier is made relation discrimination possible and there is an already-used pseudonymous-name identifier whose relation can be discriminated, communication is performed by reusing that pseudonymous-name communication identifier is explained in each of the above-described exemplary embodiments. However, even when the pseudonymous-name communication identifier is made relation discrimination possible, a new pseudonymous-name communication identifier whose relation can be discriminated may be generated and communication may be performed by using the generated pseudonymous-name communication identifier (regardless of whether or not there is an already-used pseudonymous-name communication identifier whose relation can be discriminated).

Further, examples of the communication source device 200 in each of the above-described exemplary embodiments include a communication device in which a Web application can be used instead of or in addition to an SIP phone and email transmission.

The processes in each of the above-described exemplary embodiments can be implemented as a program that is executed by a computer. The program can be stored in various types of storage media, or can be transmitted through a communication medium. Example of the storage media include flexible discs, hard disk drives, magnetic discs, magneto-optic discs, CD-ROMs, DVDs, ROM cartridges, RAM memory cartridges with battery backup, flash memory cartridges, and nonvolatile RAM cartridges. Further, examples of the communication medium include wired communication media such as telephone lines, wireless communication media such as microwave lines, and Internet.

The present invention can be applied to communication devices, communication systems, communication methods, and recording media storing a program.

The invention claimed is:
1. A communication device comprising:
communication unit capable of performing communication configured from a plurality of communication layers by using a pseudonymous-name communication identifier in a communication layer where a communication identifier needs to be converted into a pseudonymous name, and relation discrimination possibility determination unit to determine a relation discrimination possibility of a pseudonymous-name communication identifier of a communication layer where a communication identifier needs to be converted into a pseudonymous name when the communication is performed by the communication unit, wherein the relation discrimination possibility determination unit determines a relation discrimination possibility of a pseudonymous-name communication identifier of a specific communication layer among the plurality of communication layers to a designated one of relation discrimination possible and relation discrimination impossible, and determines whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

2. The communication device according to claim 1, further comprising relation discrimination-property determination rule storage unit that stores and holds a relation discrimination-property determination rule used to determine, according to a relation discrimination possibility of a pseudonymous-name communication identifier of a specific communication layer, whether a relation discrimination possibility of a pseudonymous-name communication identifier of another communication layer should be relation discrimination possible or relation discrimination impossible, wherein the relation discrimination-property determination rule storage unit determines whether a pseudonymous-name communication identifier of the another communication layer should be relation discrimination possible or relation discrimination impossible according to the relation discrimination-property determination rule.

3. The communication device according to claim 2, further comprising:

communication layer information storage unit to store and hold communication layer information indicating a communication layer where a communication identifier needs to be converted into a pseudonymous name among the plurality of communication layers; and pseudonymous-name conversion requiring communication layer recognition unit to recognize a communication layer where a communication identifier needs to be converted into a pseudonymous name by referring to the communication layer information, wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

4. The communication device according to claim 2, further comprising:

communication type layer information storage unit to store and hold communication type layer information indicating a correspondence relation between a type of communication that the communication unit can perform and a communication layer where a communication identifier needs to be converted into a pseudonymous name among the plurality of communication layers; and pseudonymous-name conversion requiring communication layer recognition unit to recognize a communication layer where a communication identifier needs to be converted into a pseudonymous name according to a type of communication that the communication unit performs by referring to the communication type layer information, wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

5. The communication device according to claim 2, further comprising:

communication destination layer information storage unit to store and hold communication destination layer information indicating a correspondence relation between a communication identifier of a communication destination device and a communication layer where a communication identifier needs to be converted into a pseudonymous name among the plurality of communication layers; and pseudonymous-name conversion requiring communication layer recognition unit to recognize a communication layer where a communication identifier needs to be converted into a pseudonymous name according to a communication identifier of the communication destination device by referring to the communication destination layer information, wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

6. The communication device according to claim 2, wherein the relation discrimination-property determination rule includes a rule specifying that if a communication identifier of an upper layer among communication layers where a communication identifier needs to be converted into a pseudonymous name is a pseudonymous-name communication identifier whose relation cannot be discriminated, a pseudonymous-name communication identifier of a lower layer should be made relation discrimination impossible.

7. The communication device according to any one of claims 2 to 5, wherein the relation discrimination-property determination rule includes a rule specifying that if a communication identifier of an upper layer among communication layers where a communication identifier needs to be converted into a pseudonymous name is a pseudonymous-name communication identifier whose relation can be discriminated, a pseudonymous-name communication identifier of a lower layer should be made relation discrimination possible.

8. The communication device according to claim 1, further comprising:
communication layer information storage unit to store and hold communication layer information indicating a communication layer where a communication identifier needs to be converted into a pseudonymous name among the plurality of communication layers;
pseudonymous-name conversion requiring communication layer recognition unit to recognize a communication layer where a communication identifier needs to be converted into a pseudonymous name by referring to the communication layer information;
transfer plan information storage unit to store and hold transfer plan information indicating a transfer plan of a communication source device provided in the communication device;
transfer plan recognition unit to recognize a transfer plan of the communication source device by referring to the transfer plan information; and
relation discrimination-property determination rule storage unit that stores and holds a relation discrimination-property determination rule used to determine, according to a transfer plan of the communication source device and a relation discrimination possibility of a pseudonymous-name communication identifier of a specific communication layer, whether a relation discrimination possibility of a pseudonymous-name communication identifier of another communication layer should be relation discrimination possible or relation discrimination impossible,
wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to a transfer plan of the communication source device recognized by the transfer plan recognition unit and the relation discrimination-property determination rule.

9. The communication device according to claim 1, further comprising pseudonymous-name communication identifier generation unit to generate a pseudonymous-name communication identifier of a communication layer of at least any one of communication layers where a communication identifier needs to be converted into a pseudonymous name.

10. The communication device according to claim 1, further comprising a communication source device, and a relay device,
wherein the communication source device performs, in at least any one of communication layers where a communication identifier needs to be converted into a pseudonymous name, communication using a pseudonymous-name communication identifier by performing communication by selecting any one of a plurality of relay devices capable of relaying communication with a communication destination device.

11. The communication device according to claim 1, further comprising relation discrimination possibility inquiry unit to inquire of a user about to which of relation discrimination possible or relation discrimination impossible a relation discrimination possibility of the specified communication layer should be designated.

12. The communication device according to claim 1, wherein the communication source device performs communication using the pseudonymous-name communication identifier directly with a communication destination device.

13. A device to determine a relation discrimination possibility of a pseudonymous-name communication identifier comprising:
relation discrimination possibility determination unit to determine a relation discrimination possibility of a pseudonymous-name communication identifier of a communication layer where a communication identifier needs to be converted into a pseudonymous name when a communication device capable of performing communication by using a pseudonymous-name communication identifier in a communication layer where a communication identifier needs to be converted into a pseudonymous name performs communication configured from a plurality of communication layers, and
notification unit to notify a determined relation discrimination-property possibility to the communication device,
wherein the relation discrimination possibility determination unit
determines a relation discrimination possibility of a pseudonymous-name communication identifier of a specific communication layer among the plurality of communication layers to a designated one of relation discrimination possible and relation discrimination impossible, and
determines whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

14. The device to determine a relation discrimination possibility of a pseudonymous-name communication identifier according to claim 13, further comprising relation discrimination-property determination rule storage unit that stores and holds a relation discrimination-property determination rule used to determine, according to a relation discrimination possibility of a pseudonymous-name communication identifier of a specific communication layer, whether a relation discrimination possibility of a pseudonymous-name communication identifier of another communication layer should be relation discrimination possible or relation discrimination impossible,
wherein the relation discrimination-property determination rule storage unit determines whether a pseudonymous-name communication identifier of the another communication layer should be relation discrimination possible or relation discrimination impossible according to the relation discrimination-property determination rule.

15. The device to determine a relation discrimination possibility of a pseudonymous-name communication identifier according to claim 14, further comprising:
communication layer information storage unit to store and hold communication layer information indicating a communication layer where a communication identifier needs to be converted into a pseudonymous name among the plurality of communication layers; and
pseudonymous-name conversion requiring communication layer recognition unit to recognize a communication layer where a communication identifier needs to be converted into a pseudonymous name by referring to the communication layer information,
wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

16. The device to determine a relation discrimination possibility of a pseudonymous-name communication identifier according to claim 14, further comprising:
communication type layer information storage unit to store and hold communication type layer information indicating a correspondence relation between a type of communication that the communication unit can perform and a communication layer where a communication identifier needs to be converted into a pseudonymous name among the plurality of communication layers; and
pseudonymous-name conversion requiring communication layer recognition unit to recognize a communication layer where a communication identifier needs to be converted into a pseudonymous name according to a type of communication that the communication unit performs by referring to the communication type layer information,
wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

17. The device to determine a relation discrimination possibility of a pseudonymous-name communication identifier according to claim 14, further comprising:
communication destination layer information storage unit to store and hold communication destination layer information indicating a correspondence relation between a communication identifier of a communication destination device and a communication layer where a communication identifier needs to be converted into a pseudonymous name among the plurality of communication layers; and
pseudonymous-name conversion requiring communication layer recognition unit to recognize a communication layer where a communication identifier needs to be converted into a pseudonymous name according to a communication identifier of the communication destination device by referring to the communication destination layer information,
wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

18. The device to determine a relation discrimination possibility of a pseudonymous-name communication identifier according to claim 14, wherein the relation discrimination-property determination rule includes a rule specifying that if a communication identifier of an upper layer among communication layers where a communication identifier needs to be converted into a pseudonymous name is a pseudonymous-name communication identifier whose relation cannot be discriminated, a pseudonymous-name communication identifier of a lower layer should be made relation discrimination impossible.

19. The device to determine a relation discrimination possibility of a pseudonymous-name communication identifier according to claim 14, wherein the relation discrimination-property determination rule includes a rule specifying that if a communication identifier of an upper layer among communication layers where a communication identifier needs to be converted into a pseudonymous name is a pseudonymous-name communication identifier whose relation can be discriminated, a pseudonymous-name communication identifier of a lower layer should be made relation discrimination possible.

20. The device to determine a relation discrimination possibility of a pseudonymous-name communication identifier according to claim 13, further comprising:
communication layer information storage unit to store and hold communication layer information indicating a communication layer where a communication identifier needs to be converted into a pseudonymous name among the plurality of communication layers;
pseudonymous-name conversion requiring communication layer recognition unit to recognize a communication layer where a communication identifier needs to be converted into a pseudonymous name by referring to the communication layer information;
transfer plan information storage unit to store and hold transfer plan information indicating a transfer plan of a communication source device provided in the communication device;
transfer plan recognition unit to recognize a transfer plan of the communication source device by referring to the transfer plan information; and
relation discrimination-property determination rule storage unit that stores and holds a relation discrimination-property determination rule used to determine, according to a transfer plan of the communication source device and a relation discrimination possibility of a pseudonymous-name communication identifier of a specific communication layer, whether a relation discrimination possibility of a pseudonymous-name communication identifier of another communication layer should be relation discrimination possible or relation discrimination impossible, wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to a transfer plan of the communication source device recognized by the transfer plan recognition unit and the relation discrimination-property determination rule.

21. A communication system comprising a communication device, and a communication destination device with which the communication device communicates, the communication device comprising:

communication unit capable of performing communication configured from a plurality of communication layers by using a pseudonymous name communication identifier in a communication layer where a communication identifier needs to be converted into a pseudonymous name, and relation discrimination possibility determination unit to determine a relation discrimination possibility of a pseudonymous-name communication identifier of a communication layer where a communication identifier needs to be converted into a pseudonymous name when the communication is performed by the communication unit, wherein the relation discrimination possibility determination unit determines a relation discrimination possibility of a pseudonymous-name communication identifier of a specific communication layer among the plurality of communication layers to a designated one of relation discrimination possible and relation discrimination impossible, and determines whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

22. The communication system according to claim 21, further comprising relation discrimination-property determination rule storage unit that stores and holds a relation discrimination-property determination rule used to determine, according to a relation discrimination possibility of a pseudonymous-name communication identifier of a specific communication layer, whether a relation discrimination possibility of a pseudonymous-name communication identifier of another communication layer should be relation discrimination possible or relation discrimination impossible, wherein the relation discrimination-property determination rule storage unit determines whether a pseudonymous-name communication identifier of the another communication layer should be relation discrimination possible or relation discrimination impossible according to the relation discrimination-property determination rule.

23. The communication system according to claim 22, wherein the communication device further comprises:

communication layer information storage unit to store and hold communication layer information indicating a communication layer where a communication identifier needs to be converted into a pseudonymous name among the plurality of communication layers; and pseudonymous-name conversion requiring communication layer recognition unit to recognize a communication layer where a communication identifier needs to be converted into a pseudonymous name by referring to the communication layer information, wherein the relation discrimination possibility determination unit recognizes an upper layer among communication layers that are recognized as requiring a communication identifier to be converted into a pseudonymous name as the specific communication layer, determines a relation discrimination possibility of a pseudonymous-name communication identifier of the upper layer to the designated one, and after that determines a relation discrimination possibility of a pseudonymous-name communication identifier of the another communication layer according to the relation discrimination-property determination rule.

24. A communication method comprising:

a first step of determining a relation discrimination possibility of a pseudonymous-name communication identifier of a communication layer where a communication identifier needs to be converted into a pseudonymous name when communication configured from a plurality of communication layers is performed by communication unit capable of performing communication by using a pseudonymous-name communication identifier in a communication layer where a communication identifier needs to be converted into a pseudonymous name, wherein the first step comprising:

a second step of determining a relation discrimination possibility of a pseudonymous-name communication identifier of a specific communication layer among the plurality of communication layers to a designated one of relation discrimination possible and relation discrimination impossible, and a third step of determining whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

25. The communication method according to claim 24, wherein in the third step, whether a pseudonymous-name communication identifier of the another communication layer should be relation discrimination possible or relation discrimination impossible is determined according to a relation discrimination-property determination rule, the relation discrimination-property determination rule being used to determine, according to a relation discrimination possibility of a pseudonymous-name communication identifier of a specific communication layer, whether a relation discrimination possibility of a pseudonymous-name communication identifier of another communication layer should be relation discrimination possible or relation discrimination impossible.

26. A non-transitory computer readable medium storing a program that causes a computer to execute a first process of determining a relation discrimination possibility of a pseudonymous-name communication identifier of a communication layer where a communication identifier needs to be converted into a pseudonymous name when communication configured from a plurality of communication layers is performed by communication unit capable of performing communication by using a pseudonymous-name communication identifier in a communication layer where a communication identifier needs to be converted into a pseudonymous name, wherein the first process comprising:

a process of determining a relation discrimination possibility of a pseudonymous-name communication identifier of a specific communication layer among the plurality of communication layers to a designated one of relation discrimination possible and relation discrimination impossible, and a process of determining whether a relation discrimination possibility of a pseudonymous-name communication identifier of another communication layer among the plurality of communication layers should be relation discrimination possible or relation discrimination impossible according to which one of relation discrimination possible and relation discrimination impossible the pseudonymous-name communication identifier of the specific communication layer is.

* * * * *